US010817136B2

(12) United States Patent
Li

(10) Patent No.: US 10,817,136 B2
(45) Date of Patent: Oct. 27, 2020

(54) METHOD FOR SWITCHING USER INTERFACE BASED UPON A ROTATION GESTURE AND ELECTRONIC DEVICE USING THE SAME

(71) Applicant: Lenovo (Beijing) Co., Ltd., Beijing (CN)

(72) Inventor: Shi Li, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 882 days.

(21) Appl. No.: 14/753,329

(22) Filed: Jun. 29, 2015

(65) Prior Publication Data
US 2016/0170579 A1    Jun. 16, 2016

(30) Foreign Application Priority Data
Dec. 15, 2014    (CN) .......................... 2014 1 0777898

(51) Int. Cl.
*G06F 1/16*       (2006.01)
*G06F 3/0488*     (2013.01)
(Continued)

(52) U.S. Cl.
CPC ............ *G06F 3/0482* (2013.01); *G06F 1/163* (2013.01); *G06F 3/017* (2013.01); *G06F 3/04883* (2013.01); *G06F 2203/0339* (2013.01)

(58) Field of Classification Search
CPC .... G06F 3/0482; G06F 3/017; G06F 3/04883; G06F 3/04847; G06F 3/0487; G06F 1/163; G06F 2203/0339
See application file for complete search history.

(56) References Cited

U.S. PATENT DOCUMENTS 6,556,222 B1 * 4/2003 Narayanaswami .. G04G 9/0064
368/295
9,477,313 B2 * 10/2016 Mistry .................... G06F 3/014
(Continued)

FOREIGN PATENT DOCUMENTS

CN           1330303 A     1/2002
CN         102938818 A     2/2013
(Continued)

OTHER PUBLICATIONS

Shrader, "Lenovo backing Raleigh boy's smartwatch design", https://www.wral.com/lenovo-backing-raleigh-boy-s-smartwatch-design/14078805/, Oct. 30, 2014.*
(Continued)

*Primary Examiner* — Jennifer N To
*Assistant Examiner* — Amy P Hoang
(74) *Attorney, Agent, or Firm* — Harness, Dickey & Pierce, P.L.C.

(57) ABSTRACT

A control method applied in an electronic device preset with at least two applications is provided. In the case of switching an interface of a first application to an interface of a second application, first, if sense information received meets a preset switching condition, the interface of the first application is switched to a navigation interface including identification information of various applications, and the user may determine rapidly the relative position between the identification information of the first application and the second application as a target application based on the arrangement of the various identification information, and then the user performs a rotating operation in a preset operating region, and when the rotating operation finishes, based on the relative relationship between the positions where the rotating operation finishes and starts, the elec-
(Continued)

tronic device positions the target application rapidly, and displays the display interface of the target application.

14 Claims, 14 Drawing Sheets

(51) Int. Cl.
  *G06F 3/0482* (2013.01)
  *G06F 3/01* (2006.01)

(56) References Cited

U.S. PATENT DOCUMENTS

| | | | | |
|---|---|---|---|---|
| 9,489,062 | B2* | 11/2016 | Corcoran | H04L 12/2818 |
| 2002/0180579 | A1* | 12/2002 | Nagaoka | H04L 12/2803 |
| | | | | 340/3.1 |
| 2006/0161870 | A1* | 7/2006 | Hotelling | G06F 3/0485 |
| | | | | 715/863 |
| 2010/0245107 | A1* | 9/2010 | Fulker | H04L 12/2803 |
| | | | | 340/691.6 |
| 2012/0130547 | A1* | 5/2012 | Fadell | F24F 11/30 |
| | | | | 700/276 |
| 2012/0131504 | A1* | 5/2012 | Fadell | F24D 19/1084 |
| | | | | 715/810 |
| 2013/0054863 | A1* | 2/2013 | Imes | H04L 12/2827 |
| | | | | 710/304 |
| 2013/0090767 | A1* | 4/2013 | Bruck | G05D 23/1902 |
| | | | | 700/276 |
| 2013/0167074 | A1* | 6/2013 | Oonishi | G06F 3/0488 |
| | | | | 715/799 |
| 2014/0319232 | A1* | 10/2014 | Gourlay | G05D 23/1905 |
| | | | | 236/51 |
| 2014/0365019 | A1* | 12/2014 | Gourlay | G05D 23/1905 |
| | | | | 700/278 |
| 2015/0005953 | A1* | 1/2015 | Fadell | F24F 11/30 |
| | | | | 700/276 |
| 2015/0066220 | A1* | 3/2015 | Sloo | G05D 23/1902 |
| | | | | 700/276 |
| 2015/0160856 | A1* | 6/2015 | Jang | G06F 3/04886 |
| | | | | 715/773 |
| 2015/0286391 | A1* | 10/2015 | Jacobs | G06F 1/163 |
| | | | | 715/771 |
| 2015/0331589 | A1* | 11/2015 | Kawakita | G06F 1/163 |
| | | | | 715/834 |
| 2016/0091867 | A1* | 3/2016 | Mansour | G06F 1/163 |
| | | | | 368/294 |
| 2016/0103985 | A1* | 4/2016 | Shim | G06F 3/0346 |
| | | | | 726/19 |
| 2016/0124401 | A1* | 5/2016 | Li | G05B 15/02 |
| | | | | 700/275 |
| 2016/0154624 | A1* | 6/2016 | Son | G06F 3/167 |
| | | | | 704/235 |

FOREIGN PATENT DOCUMENTS

| | | |
|---|---|---|
| CN | 103034348 A | 4/2013 |
| CN | 103268193 A | 8/2013 |
| CN | 103294345 A | 9/2013 |
| CN | 103399480 A | 11/2013 |
| CN | 103777615 A | 5/2014 |
| CN | 103793176 A | 5/2014 |
| CN | 103809853 A | 5/2014 |
| CN | 104049981 A | 9/2014 |

OTHER PUBLICATIONS

First Chinese Office Action regarding Application No. 201410777898.3 dated Mar. 15, 2017. English translation provided by Unitalen Attorneys at Law.

Fourth Chinese Office Action regarding Application No. 20141777898.3 dated Aug. 7, 2019. English translation provided by Unitalen Attorneys at Law.

* cited by examiner

METHOD FOR SWITCHING USER INTERFACE BASED UPON A ROTATION GESTURE AND ELECTRONIC DEVICE USING THE SAME

CROSS REFERENCE OF RELATED APPLICATION

The present application claims the priority to Chinese Patent Application No. 201410777898.3, entitled "CONTROL METHOD AND ELECTRONIC DEVICE", filed on Dec. 15, 2014 with the State Intellectual Property Office of the PRC, which is incorporated herein by reference in its entirety.

FIELD

The disclosure relates to the field of electronic devices, and in particular to a control method and an electronic device.

BACKGROUND

With the rapid development of science and technology, a variety of electronic devices have become an essential part of people's daily life. All kinds of electronic devices with a small screen are also widely used in various fields, such as a cellphone and a wristband type smart terminal which have small screens.

Generally, a number of applications are installed in an electronic device. However, due to the limitation of screen size, an interface displayed on the electronic device screen can only show information of one application at a time.

In the conventional technology, to control the switching of the information presented on the display screen of the electronic device, a user generally performs gestures of sliding right and left or up and down on a touch display screen, to control the information displayed on the display screen to be switched right and left or up and down.

However, with such a method, since the relative position between an application interface displayed currently and a target application interface (i.e., the number of application interfaces between the application interface displayed currently and the target application interface) cannot be known previously, during switching, positioning the target application interface fast and accurately cannot be achieved.

SUMMARY

In view of this, a control method is provided according to the disclosure, which addresses the issue in the conventional technology that positioning a target application interface fast and accurately cannot be achieved since the relative position between an application interface displayed currently and the target application interface cannot be known previously.

To achieve the above object, the following technical solutions are provided according to the disclosure.

It is provided according to the disclosure a control method for controlling an electronic device. The control method includes:

controlling content currently displayed by a display of the electronic device to be switched from an interface of a first application to a navigation interface in response to sense information meeting a preset switching condition, where the navigation interface includes identification information of each of at least two applications, and the sense information represents that an operating body performs a preset operation on the electronic device;

acquiring information of a first rotating operation gesture performed by the operating body in a preset operating region in the electronic device;

determining a second application as a target application based on the identification information of each application in the navigation interface and the information of the first rotating operation gesture; and acquiring an interface of the second application, and controlling to display the interface of the second application in the display.

It is further provided according to the disclosure an electronic device. The electronic device includes:

a display configured to display an interface of each of applications, and to display currently the an interface of a first application;

a sensor arranged to surround an outer side of the display, and configured to acquire sense information generated by an operating body in a preset operating region of the electronic device; and a controller connected respectively with the sensor and the display, and configured to: control the content currently displayed by the display of the electronic device to be switched from the interface of the first application to a navigation interface when the sense information meets a preset switching condition, with the navigation interface including identification information of each of the at least two applications; and determine a second application as a target application based on information of a rotating operation gesture acquired by the sensor in the preset operating region and the identification information of each application in the navigation interface; and acquire an interface of the second application, and control to display the interface of the second application in the display, where the sensor and the display are arranged not to overlap each other in the direction of displaying.

It is further provided according to the disclosure a wearable device including an electronic device, the electronic device includes:

a display configured to display an interface of each of applications, and to display currently the interface of a first application;

a sensor arranged to surround an outer side of the display, and configured to acquire sense information generated by an operating body in a preset operating region of the electronic device; and a controller connected respectively with the sensor and the display, and configured to: control content currently displayed by the display of the electronic device to be switched from the interface of the first application to a navigation interface when the sense information meets a preset switching condition, with the navigation interface including identification information of each of the at least two applications; determine a second application as a target application based on information of a rotating operation gesture acquired by the sensor in the preset operating region and the identification information of each application in the navigation interface; and acquire an interface of the second application, and control to display the interface of the second application in the display, where the sensor and the display are arranged not to overlap each other in a direction of displaying.

It can be seen from the above technical solutions that, compared with the conventional technology, a control method is provided according to the disclosure, which is applied in an electronic device having a display. At least two applications are preset in the electronic applications, and the at least two application are respectively displayed on different interfaces. An interface of a first application is currently displayed in the display of the electronic device. The display of the electronic device is controlled to switch the content currently displayed from the first display interface to a navigation interface if sense information received meets a preset switching condition; and after information of a rotating operation gesture performed by the operating body in a preset operating region is acquired, a second application is selected to be a target application in conjunction with the information of the rotating operation gesture and the display information on the navigation interface; and then an interface of the second application is acquired and is displayed in the display. With the control method, in the case of switching the interface of the first application to an interface of a second application, first, if sense information received meets a preset switching condition, the interface of the first application is switched to a navigation interface. Identification information of each application in the electronic device is included in the navigation interface, and the user may determine rapidly the relative position between the identification information of the first application and the identification information of the second application as a target application based on the arrangement of the various identification information in the navigation interface displayed in the display. Then the user performs a rotating operation in the preset operating region, and when the rotating operation finishes, based on the relative relationship between the position where the rotating operation finishes and the position where the rotating operation starts, the electronic device positions the target application rapidly, and displays the display interface of the target application in the display.

BRIEF DESCRIPTION OF THE DRAWINGS

For more clearly illustrating embodiments of the disclosure or the technical solutions in the conventional technology, drawings referred to describe the embodiments or the conventional technology will be briefly described hereinafter. Apparently, the drawings in the following description are only examples of the disclosure, and for the person skilled in the art, other drawings may be obtained based on the provided drawings without any creative efforts.

DETAILED DESCRIPTION OF THE EMBODIMENTS

The technical solutions in the embodiments of the disclosure will be described clearly and completely hereinafter in conjunction with the drawings in the embodiments of the disclosure. Apparently, the described embodiments are only a part of the embodiments of the disclosure, rather than all embodiments. Based on the embodiments in the disclosure, all of other embodiments, made by the person skilled in the art without any creative efforts, fall into the scope of the disclosure.

Figure 1:
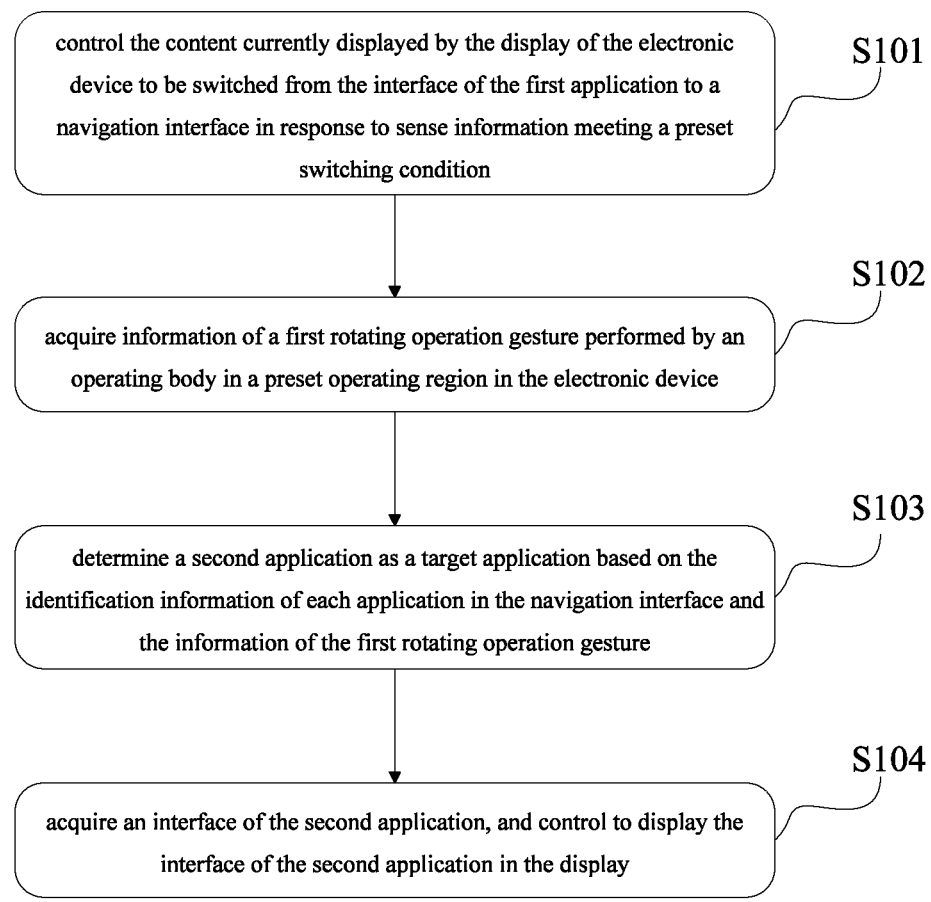
FIG. 1 is a flowchart of a first embodiment of a control method according to the disclosure.

As shown in FIG. 1, which is a flowchart of a first embodiment of a control method according to the disclosure, the control method is applied in an electronic device having a display, and the electronic device is preset with at least two applications, and the display displays currently an interface of a first application.

The control method can be implemented by the following steps S101 to S104.

In step S101, the content currently displayed by the display of the electronic device is controlled to be switched from the interface of the first application to a navigation interface in response to sense information meeting a preset switching condition.

The navigation interface includes identification information of each of the at least two applications, and the sense information represents that an operating body performs a preset operation on the electronic device.

For any identification information corresponding to a respective application in the navigation interface, the identification information can serve as a gateway to the application.

In implementation, the identification information can be represented by an icon or brief information, and each piece of identification information has a preset region coverage, and in the case that the region coverage falls into a selected region, it means an application corresponding to the identification information is selected.

For example, in the case that the identification information represents an application related to the temperature, the identification information may be embodied as an icon in the shape of a thermometer or brief information of 25 degrees Celsius.

Upon receiving the sense information, it is determined whether the sense information meets the preset switching condition, and the display of the electronic device is controlled to switch the content displayed if the sense information meets the preset switching condition, and the sense information is ignored if the sense information does not meet the preset switching condition.

The process of determining whether the sense information meets the preset switching condition will be described in detail in subsequent embodiments, and will not be described in detail in this embodiment.

Controlling the content displayed by the electronic device to be switched from the interface of the first application to a navigation interface includes: exiting the interface of the first application; the identification information of each of the at least two applications is acquired; the various identification information is arranged in a single line on an edge of the navigation interface based on a preset arrangement, and the navigation interface in which the identification information is arranged is displayed on the display of the electronic device.

It is to be noted that the arrangement of the identification information corresponds to a rotating operation gesture performed in subsequent steps.

In implementation, generally, the identification information of the first application is placed in a position having an optimal viewing angle, and then the rest identification information other than the first application in the electronic device is arranged based on a preset order.

The preset order may be set manually, but may also be set automatically by a program in the electronic device, and the rule for arranging the identification information is not limited in the present application.

In step S102, information of a first rotating operation gesture performed by the operating body in a preset operating region in the electronic device is acquired.

The electronic device is preset with an operating region for performing a gesture operation, and the operating body performs a rotating operation gesture in the preset operating region.

It is to be noted that, in the case that the electronic device has a small volume, the preset operating region may be arranged on the outer edge of the electronic device. In this way, five fingers of a user may surround the outer edge of the electronic device, to perform the rotating operation at the outer edge of the electronic device, and the content displayed in the display moves in a rotating manner along with the rotating operation.

It is to be noted that, in the case that the electronic device has a large volume, the preset operating region may be arranged in proportion to the display. Thus, when a finger of the user performs a rotating operation in the operating region, the content displayed in the display moves in a rotating manner along with the rotating operation.

In step S103, a second application is determined as a target application based on the identification information of each application in the navigation interface and the information of the first rotating operation gesture.

The first rotating operation gesture is configured to adjust a selected application in the navigation interface.

As the content displayed previously in the display interface of the electronic device is the interface of the first application, then after being switched into the navigation interface, for indicting the identification information selected, the identification information of the first application is highlighted. The first rotating operation gesture is configured to adjust the selected identification information, and new selected identification information is determined depending on a direction of the first rotating operation gesture and an angle by which the first rotating operation gesture rotates.

The order of the identification information of the applications in the navigation interface is determined, and the information of the first rotating operation gesture has the selected region passing the identification information of each application based on the order of the identification information, and finally reaching the target application.

In implementation, the process in which identification information of the second application is selected may be exhibited in two ways: the coordinate of the selected region in the display is fixed, and the various identification information in the navigation interface moves; or the various identification information in the navigation interface is in fixed position, and the selected region moves in the navigation interface.

In practical implementation, step S103 includes: the information of the first rotating operation gesture is analyzed to acquire the rotating angle; a sub angle corresponding to two adjacent pieces of identification information to be switched is determined based on the number of pieces of the identification information included in the navigation interface and the arrangement of the identification information in the navigation interface; the number of pieces of the identification information between the identification information of the second application corresponding to the first rotating operation gesture and the identification information of the first application is determined based on a ratio of the rotating angle to the sub angle calculated, and the number of pieces of the identification information is the ratio minus 1; and the identification information of the second application is determined based on the position of the identification information of the first application and the number of pieces of the identification information between the identification information of the second application and the identification information of the first application, and the second application is recorded as the target application.

In practical implementation, in the case that the ratio of that the rotating angle to the sub angle calculated is not an integer, it is required to determine whether the ratio falls into a preset error range; and in the case that the ratio falls into a preset error range. The ratio is replaced by a ratio of an integer corresponding to the preset range, and the integer ratio minus 1 is the number of the identification information between the identification information of the second application and the identification information of the first application. In the case that the ratio does not fall into the preset error range, it may select one of two pieces identification information adjacent to the identification information corresponding to the ratio as the target application based on a preset rule, and it may also ignore the first rotating operation.

The value for the error range can be set based on the actual situation, for example, plus or minus 0.2. In this way, the ratio calculated falling into the range from 1.8 to 2.2 can be regarded as 2 times.

In step S104, an interface of the second application is acquired, and is controlled to be displayed the display.

Information corresponding to the second application is displayed in the interface of the second application.

The information of the second application may be an icon and display information corresponding to the second application, and the display information includes a numerical value corresponding to the second application, and etc.

For example, in the case that the second application is an application related to the temperature, various information, such as a temperature value, a temperature unit, will be displayed in the interface of the second application.

Figure 2:
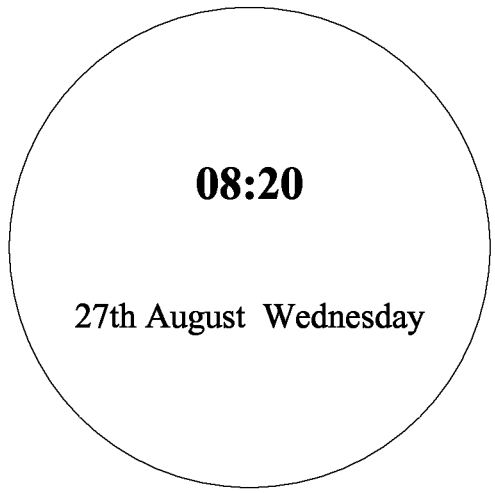
FIG. 2 is a schematic view showing an interface of a first application in the first embodiment of the control method according to the disclosure.

As shown in FIG. 2, which is a schematic view showing the interface of the first application according to this embodiment, the first application is a watch, and the current time: "08:20", the Date: "August 27" and "Wednesday" are displayed in the interface of the first application.

Figure 3:
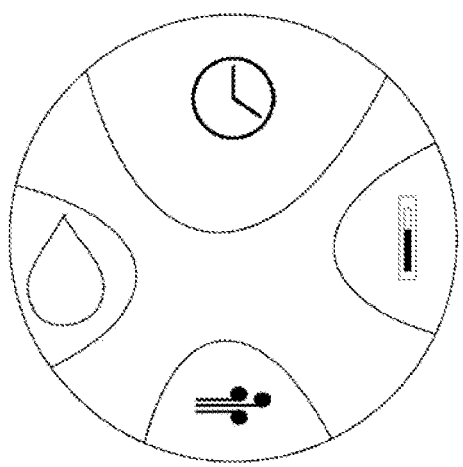
FIG. 3 is a schematic view showing a navigation interface in the first embodiment of the control method according to the disclosure.

As shown in FIG. 3, which is a schematic view showing a navigation interface according to this embodiment, in the navigation interface, icons of various applications are displayed, and are distributed on the edge region of the display, and an icon corresponding to the watch is displayed to occupy a large region, which indicates that the application of the watch is currently a selected application, and icons of the rest three applications occupy a small region, to indicate that the rest three applications are not selected.

Figure 4:
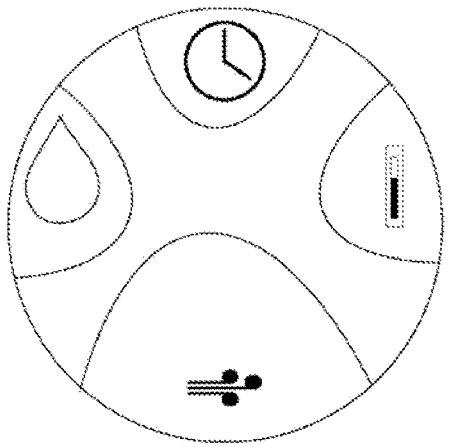
FIG. 4 is another schematic view showing a navigation interface in the first embodiment of the control method according to the disclosure.

As shown in FIG. 4, which is another schematic view showing a navigation interface according to this embodiment, in the navigation interface, an icon of an application for detecting inhalable particulate matter is displayed to occupy a large region, which indicates that the application is currently a selected application, and icons of the rest three applications (including the application of the watch) are displayed to occupy a small region, which indicates that the rest three applications are not selected.

Figure 5:
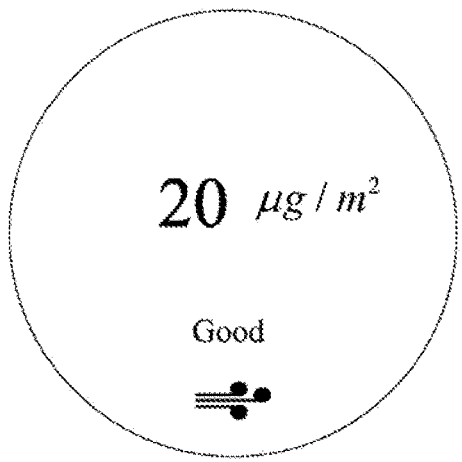
FIG. 5 is a schematic view showing an interface of a second application in the first embodiment of the control method according to the disclosure.

As shown in FIG. 5, which is a schematic view showing an interface of a second application according to this embodiment, the second application is the application for detecting the inhalable particulate matter, and a numerical value of "20", "μg/m$^2$" and "Good" are included in the interface of the second application. The "20" is a detected value of the inhalable particulate matter in the air, and the "μg/m$^2$" is the unit of the inhalable particulate matter, and the "Good" indicates the air quality level corresponding to the numerical value.

In summary, in a control method according to this embodiment, in the case of switching an interface of a first application to an interface of a second application, first, if sense information received meets a preset switching condition, the interface of the first application is switched to a navigation interface. Identification information of each application in the electronic device is included in the navigation interface, and the user may determine rapidly the relative position between the identification information of the first application and the identification information of the second application as a target application based on the arrangement of the various identification information in the navigation interface displayed in the display. Then the user performs a rotating operation in a preset operating region, and when the rotating operation finishes, based on the relative relationship between the position where the rotating operation finishes and the position where the rotating operation starts, the electronic device positions the target application rapidly, and displays the display interface of the target application in the display.

The electronic device is preset with a first sensor configured to acquire non-contact sense information, and thus the navigation interface is switched by sensing.

Figure 6:
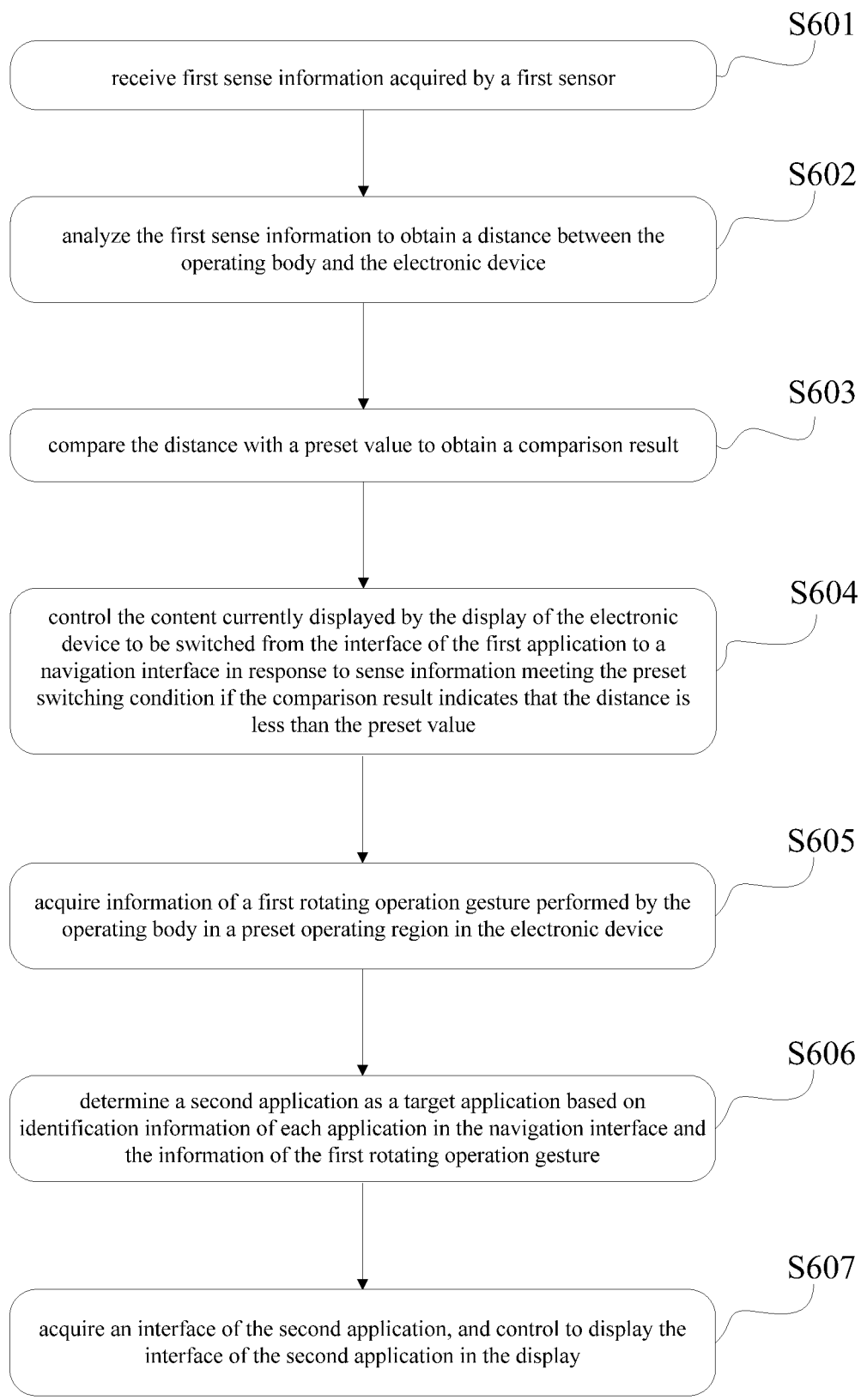
FIG. 6 is a flowchart of a second embodiment of a control method according to the disclosure.

As shown in FIG. 6, which is a flowchart of a second embodiment of a control method according to the disclosure, the control method may be implemented via the following steps S601 to S607.

In step S601, first sense information acquired by a first sensor is received.

The first sensor has a preset sensing range. In the case that the operating body approaches the electronic device and enters into the sensing range of the first sensor, the first sensor acquires the first sense information, and in the case that the operating body does not enter into the sensing range, the first sensor can not acquire the first sense information.

The first sense information represents the distance between the operating body and the electronic device.

In implementation, the sensing range can be set based on an actual situation. For example, in the case that the electronic device is a device which is placed statically in a fixed position, the information sensed by the electronic device is that the user approaches, specifically, it may be the distance between the electronic device and the user when the user enters into the sensing range, and the sensing range in such a case may be set as a large distance, such as 1 meter or 0.5 meter; or it may also be the distance between a finger of the user and the electronic device when the finger of the user approaches the electronic device, and the sensing range in such a case may be set as a small distance, such as 1 centimeter or 10 centimeters.

In step S602, the first sense information is analyzed to obtain a distance between the operating body and the electronic device.

The first sense information implies the value of the distance between the operating body and the electronic device, and just analyzing the first sense information, the distance can be obtained.

In step S603, the distance is compared with a preset value to obtain a comparison result.

The preset value is a distance threshold for starting the switching to a navigation interface.

If the distance corresponding to the first sense information is less than the preset value, it means the operating body enters into the sensing range for starting the switching to the navigation interface, and the sense information meets the preset switching condition, thus step S604 is performed; or it means the operating body does not enter into the sensing range for starting the switching to the navigation interface, and the sense information does not meet the preset switching condition, thus the sense information may be ignored.

It is to be noted that, when the operating body enters into the sensing range corresponding to the preset value of the electronic device, the content displayed by the electronic device may be then switched from the interface of the first application to the navigation interface, and this switching process speeds up the switching from the interface of the first application to the interface of the second application.

In step S604, the content currently displayed by the display of the electronic device is controlled to be switched from the interface of the first application to a navigation interface in response to sense information meeting a preset switching condition if the comparison result indicates that the distance is less than the preset value.

In step S605, information of a first rotating operation gesture performed by the operating body in a preset operating region in the electronic device is acquired.

In step S606, a second application is determined as a target application based on identification information of each application in the navigation interface and the information of the first rotating operation gesture.

In step S607, an interface of the second application is acquired, and is controlled to be displayed the display.

Steps S604 to S607 are identical with steps S101 to S104 the first embodiment, which will not be described in this embodiment.

In summary, in the control method according to this embodiment, in the case that the electronic device is preset with a first sensor configured to acquire non-contact sense information, determining whether the sense information meets the preset condition includes: first sense information acquired by the first sensor is received; the first sense information is analyzed to obtain a distance between the operating body and the electronic device; the distance is compared with a preset value to obtain a comparison result; and if the comparison result indicates that the distance is less than the preset value, the sense information meets a preset switching condition. With this method, a sensing distance between the operating body and the electronic device is detected, and based on the sensing distance, it is determined whether an interface of a first application displayed currently is switched into a navigation interface, and switching to the navigation interface may be achieved just when the user approaches the electronic device, thus the switching method is simple.

The electronic device is preset with a second sensor configured to acquire contact sense information, and it is manually controlled by the user to switch to the navigation interface.

Figure 7:
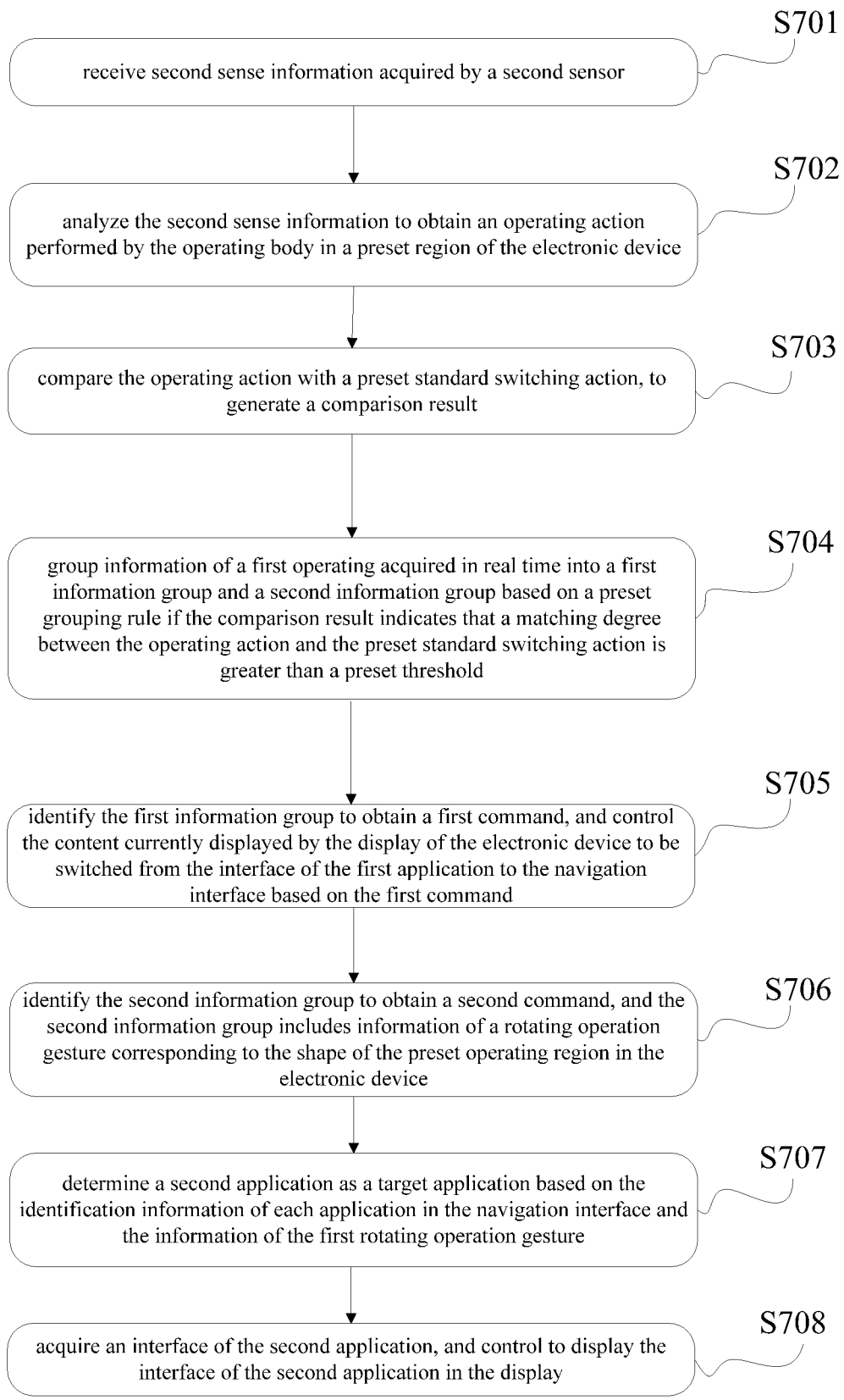
FIG. 7 is a flowchart of a third embodiment of a control method according to the disclosure.

As shown in FIG. 7, which is a flowchart of a third embodiment of a control method according to the disclosure, the control method may be implemented by the following steps S701 to S708.

In step S701, second sense information acquired by a second sensor is received.

The second sensor is arranged in a preset region of the electronic device, and when the operating body performs an operation in the preset region, second sense information is generated, and the second sensor acquires the second sense information.

The second sense information represents an action performed by the operating body in a preset region of the electronic device.

The preset region of the electronic device may be arranged in various methods, it may be arranged to overlap the display region of the display, and it may also be arranged not to overlap the display region of the display.

In the case that a second sensor is arranged in a surrounding region of the display, the display may have a small size, and the user performs an operation in the surrounding region of the display, to generate second sense information; or the display may have a large size, in such a case, the user performs an operation at a certain point in the surrounding region, to generate second sense information.

In step S702, the second sense information is analyzed to obtain an operating action performed by the operating body in a preset region of the electronic device.

The operating action may be in forms such as the operating body comes into contact with a certain position in the preset region, or the operating body performs a certain action in the preset region.

In the case that the operating action is that the operating body comes into contact with a certain position in a preset region, the information implied in the second sense information is a trace of the operating action and coordinates of the operating action in the preset region.

In the case that the operating action is that the operating body performs a certain action in a preset region, the information implied in the second sense information is a trace of the operating action.

In step S703, the operating action is compared with a preset standard switching action, to generate a comparison result.

The preset standard switching action is a standard action for starting the switching to the navigation interface.

A threshold is preset in the electronic device, and the threshold is configured to define whether the similarity between two actions meets a condition, and the threshold may be embodied as values such as 90% or 0.95 etc.

The operating action is compared with the preset standard switching action to get by calculating a matching degree, and then the matching degree is compared with a preset threshold, to obtain a comparison result.

If the comparison result indicates that the matching degree between the operating action and the preset standard switching action is greater than a preset threshold, the sense information meets the preset switching condition, and step S704 is performed; or the second sense information does not meet the preset switching condition, and the second sense information is ignored.

In step S704, information of a first operating acquired in real time is grouped into a first information group and a second information group based on a preset grouping rule if the comparison result indicates that the matching degree between the operating action and the preset standard switching action is greater than a preset threshold.

The information of the first operating represents that the operating body performs an operation in the preset operating region of the electronic device, and the information of the first operating includes information of at least two operating parameters.

The first information group is continuous with the second information group.

The preset grouping rule may be an internal of time or a manner of operating.

In the case that the grouping rule is an interval of time, there is an interval of time between an operating action corresponding to the first information group and an operating action corresponding to the second information group, i.e., there is a pause between the two operating actions.

In the case that the grouping rule is a manner of operating, the operating action corresponding to the first information group and the operating action corresponding to the second information group are actions of different type, for example, the operating action corresponding to the first information group may be an action of pressing a preset operating region, and the operating action corresponding to the second information group may be a rotating operating action performed in the preset operating region.

In step S705, the first information group is identified to obtain a first command, and the content currently displayed by the display of the electronic device is controlled to be switched from the interface of the first application to the navigation interface based on the first command.

The first information group corresponds to sense information meeting a preset switching condition, and a first command is acquired based on the sense information.

The first command is a command configured to instruct the electronic device to switch the content displayed to a navigation interface.

In step S706, the second information group is identified to obtain a second command, and the second information group includes information of a rotating operation gesture corresponding to the shape of the preset operating region in the electronic device.

In a navigation interface of the electronic device, various corresponding identification information is arranged in a single line on an edge of the navigation interface based on a preset arrangement. It is to be noted that, the arrangement of the identification information is arranged correspondingly by the rotating operation gesture corresponding to the second information group, and the user selects the selected identification information in the identification information arranged in a single line on the edge of the navigation interface via the rotating operation gesture.

The shape of the preset operating region matches with the shape of the display, and the operating body performs a selecting operation gesture in the preset operation region, and the position of the identification information in the navigation interface displayed in the display is adjusted accordingly after being selected.

Figure 8:
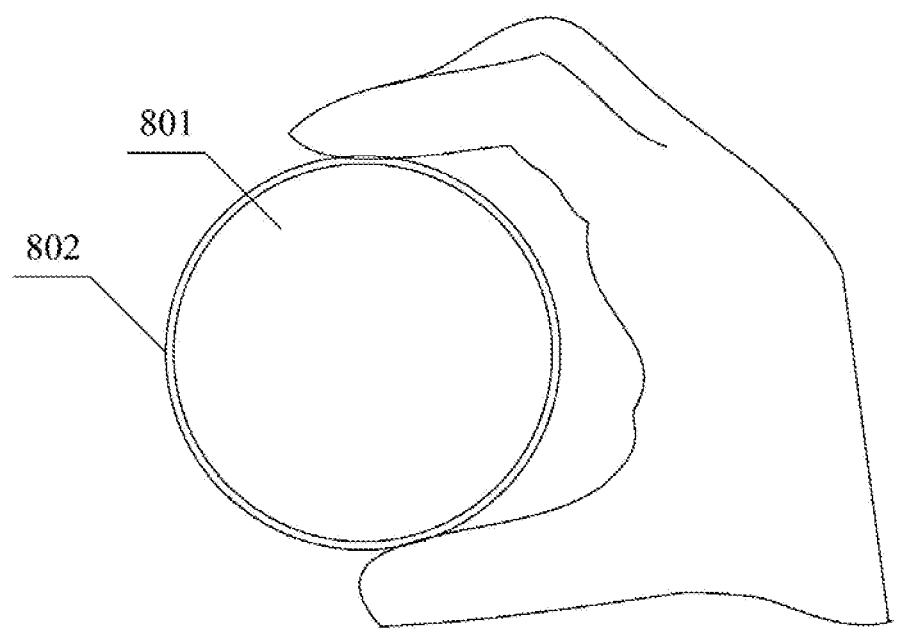
FIG. 8 is a schematic view showing a first gesture, for switching the interface of the first application to the navigation interface, in the third embodiment of a control method according to the disclosure.

As shown in FIG. 8, which is a schematic view showing a first gesture for switching the interface of the first application to the navigation interface according to this embodiment, a display 801 of the electronic device has a circular shape, and a surrounding region of the display is an operating region 802. A thumb and an index finger of the user perform pressing operation in this region, and the electronic device switches the content displayed in the display from an interface of a first application to a navigation interface in response to the pressing operation.

Figure 9:
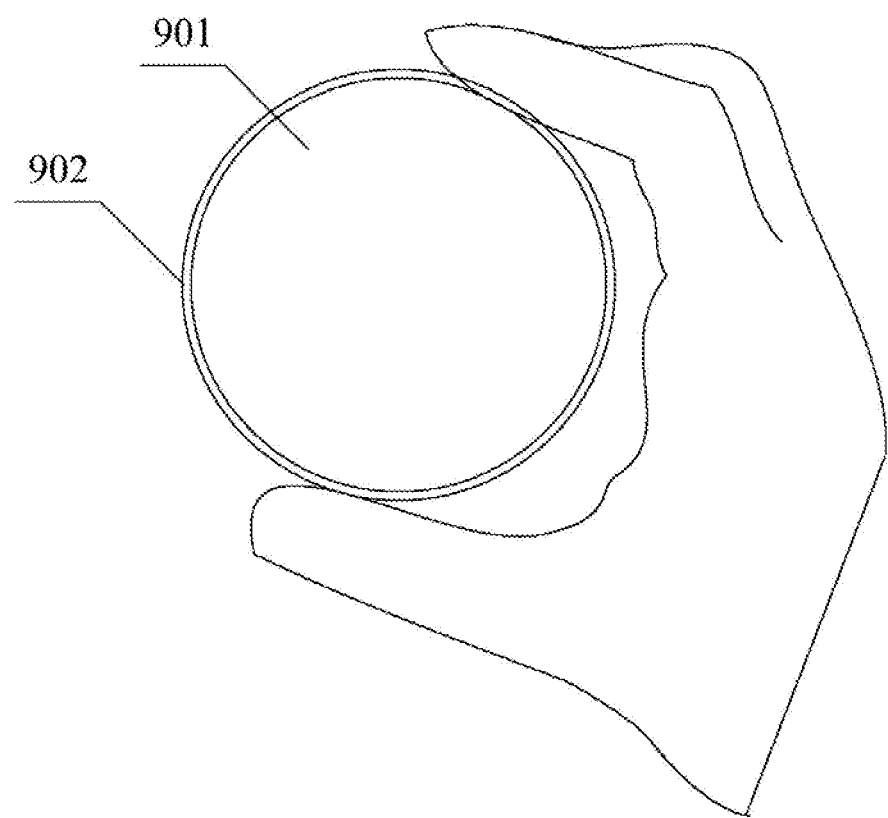
FIG. 9 is a schematic view showing a second gesture, for switching the navigation interface to the interface of the second application, in the third embodiment of a control method according to the disclosure.

As shown in FIG. 9, which is a schematic view showing a second gesture for switching the navigation interface to an interface of a second application according to this embodiment, a display 901 of the electronic device has a circular shape, and a surrounding region of the display is an operating region 902. A thumb and an index finger of the user, after performing a pressing operation in this region, keep in contact with the operating region 902, and perform a rotating operation gesture clockwise, and then an application selected in the navigation interface displayed in the display is switched from the first application to the second application.

It is to be noted that, since the first information group is continuous with the second information group, and each information group corresponds to one operating action, the information of the first operating is two operating actions of one operating body keeping in contact with an operating region. For example, in a state that the fingers of the user keep in contact with the operating region, the action of pressing the operating region is first performed, in responses to which, the electronic device has a navigation interface presented in the display, and then the user determines the application which is intended to switch to (i.e., a target application) based on the identification information displayed in the navigation interface corresponding to various applications, and perform the action of rotating operation, further in response to which, the electronic device has an interface of the target application presented in the display, and thus the whole action for switching to the second application is achieved.

It is to be noted that, the information of the first operating can be grouped to be corresponding to two gestures which are continuous, i.e., a first gesture and a second gesture, and the two gestures are of different types, however, belong to the same continuous action. The user may perform the process of starting a navigation interface and switching to a second application with one action, and the operation is simple.

In step S707, a second application is determined as a target application based on the identification information of each application in the navigation interface and the information of the first rotating operation gesture.

In step S708, an interface of the second application is acquired, and is controlled to be displayed the display.

Steps S707 to S708 are identical with Steps S101 to S104 in the first embodiment, which will not be described in this embodiment.

In summary, in a control method according to this embodiment, in the case that the second sense information is contact sense information, the controlling the content currently displayed by the display of the electronic device to be switched from the interface of the first application to a navigation interface in response to sense information meeting a preset switching condition; and the acquiring information of a first rotating operation gesture performed by the operating body in a preset operating region in the electronic device include specifically: information of a first operating acquired in real time is grouped into a first information group and a second information group based on a preset grouping rule, and the information of the first operating represents that the operating body performs an operation in the preset operating region of the electronic device, and the information of the first operating includes information of at least two operating parameters; the first information group is identified to obtain a first command, and the content currently displayed by the display of the electronic device is controlled to be switched from the interface of the first application to the navigation interface based on the first command; the second information group is identified to obtain a second command, and the second information group includes information of a rotating operation gesture corresponding to the shape of the preset operating region in the electronic device; and the first information group is continuous with the second information group. With this method, the information of the first operating can be grouped to be corresponding to two gestures which are continuous, i.e., a first gesture and a second gesture, and the two gestures are of different types, however, belong to the same continuous action. The user may perform the process of starting a navigation interface and switching to a second application with one continuous action, and the operation is simple.

The electronic device according to this embodiment is a center control device in a smart home system.

Figure 10:
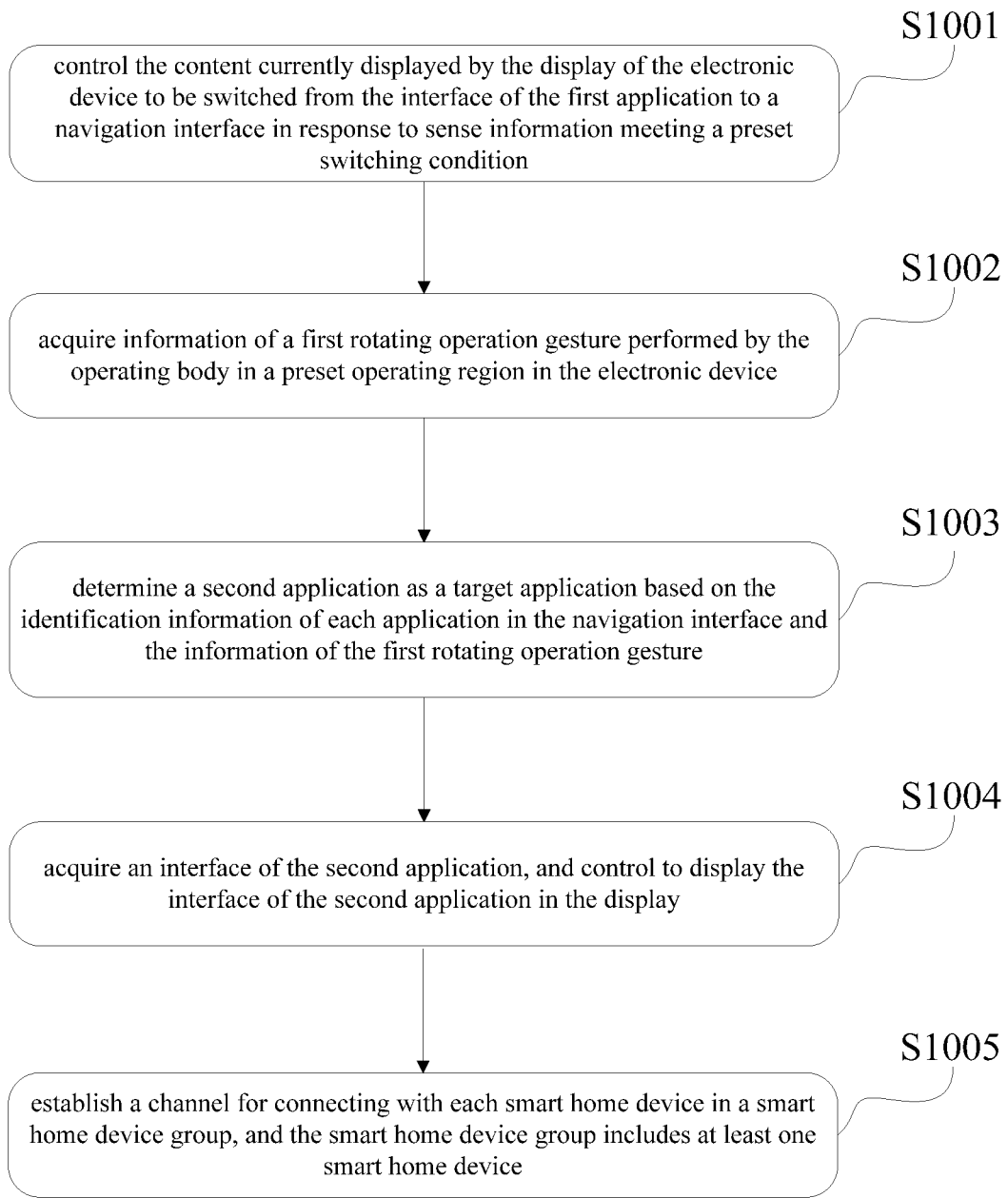
FIG. 10 is a flowchart of a fourth embodiment of a control method according to the disclosure.

As shown in FIG. 10, which is a flowchart of a fourth embodiment of a control method according to the disclosure, the control method may be implemented by the following steps S1001 to S1005.

In step S1001, the content currently displayed by the display of the electronic device is controlled to be switched from the interface of the first application to a navigation interface in response to sense information meeting a preset switching condition.

In step S1002, information of a first rotating operation gesture performed by the operating body in a preset operating region in the electronic device is acquired.

In step S1003, a second application is determined as a target application based on the identification information of each application in the navigation interface and the information of the first rotating operation gesture.

In step S1004, an interface of the second application is acquired, and is controlled to be displayed the display.

Steps S1001 to S1004 are identical with steps S101 to S104 in the first embodiment, which will not be described in this embodiment.

In step S1005, a channel for connecting with each smart home device in a smart home device group is established, and the smart home device group includes at least one smart home device.

The smart home device group is arranged in a physical space, and the variation of the working state of each smart home device can change the environment condition of the physical space. Each smart home device has a first control mode and a second control mode, and the first control mode is to respond to a received user operation, and the second control mode is to respond to a received control command sent by the electronic device.

After having established a channel for connecting each smart home device in a smart home device group, the electronic device may transmit a control command or other data information to the smart home device via the connecting channel.

It is to be noted that, the smart home device may be placed in the same physical space with the electronic device. In the case that the smart home device is placed in the same room as the electronic device, the electronic device is a center control device placed in the physical space. The smart home device and the electronic device may be placed in different physical spaces. In the case that the smart home device adjusts an environmental device in a certain room or a building, and the electronic device is placed outside the room or the building, and transmits information to the smart home device by a remote connection method, the electronic device may be a center control device placed in another physical space. The electronic device may also be a mobile center control device, such as a device of wristband type.

It is to be noted that, the electronic device, as a center control device, may control each of the smart home devices in this physical space, to realize the variation to the working state of the smart home device, and further the variation to the environment condition in the physical space.

The first control method is that the smart home device is controlled directly by the user. For example, in the case that the smart home device is an air-conditioner, it may be controlled by the user with a remote controller of the air-conditioner to regulate the temperature, and may also be controlled by a control command sent from the electronic device to adjust the running of the air-conditioner.

It is to be noted that, in this embodiment, establishing a channel for connecting to smart home devices is performed after switching to an interface of a second application is achieved, however, it is not limited to this, in implementation, the channel for connecting to the smart home devices may be established just when the electronic device starts, or a channel for only connecting to the smart home device corresponding to the second application is established after the electronic device is switched to the interface of the second application. The time and manner for establishing a channel for connecting the electronic device and each smart home device in a smart home device group are not limited in this embodiment.

In summary, a control method according to this embodiment further includes a channel for connecting with each smart home device in a smart home device group is established, and the smart home device group includes at least one smart home device. The smart home device group is arranged in a physical space, and the variation of the working state of each smart home device can change the environment condition of the physical space. Each smart home device has a first control mode and a second control mode, and the first control mode is to respond to a received user operation, and the second control mode is to respond to a received control command sent by the electronic device. With this method, the electronic device, as a center control device, controls each smart home device in a smart home device group, and thus achieving the control to the smart home device group.

The electronic device according to this embodiment is a center control device in a smart home system.

Figure 11:
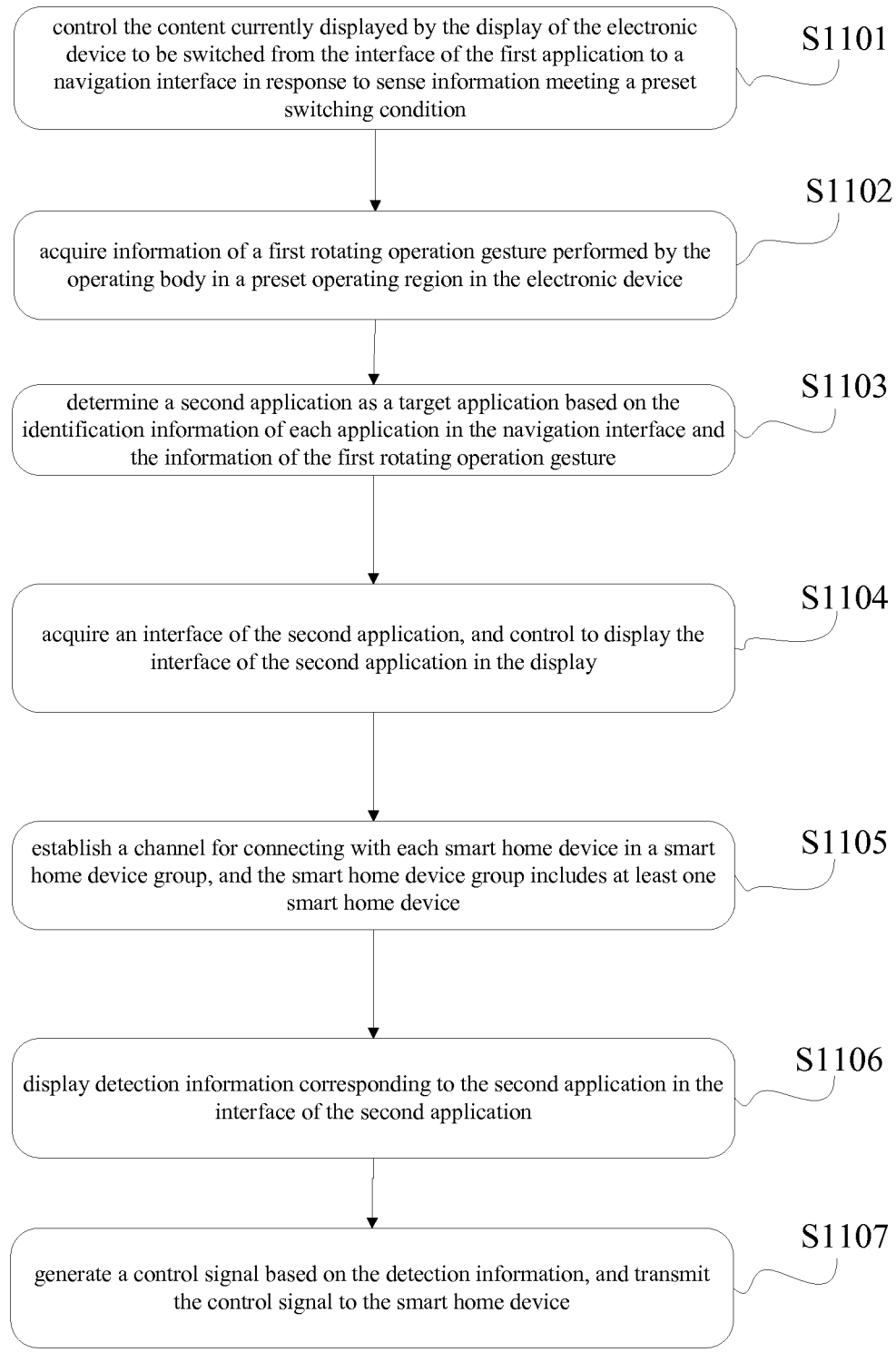
FIG. 11 is a flowchart of a fifth embodiment of a control method according to the disclosure.

As shown in FIG. 11, which is a flowchart of a fifth embodiment of a control method according to the disclosure, the control method may be implemented by the following steps S1101 to S1106.

In step S1101, the content currently displayed by the display of the electronic device is controlled to be switched from the interface of the first application to a navigation interface in response to sense information meeting a preset switching condition.

In step S1102, information of a first rotating operation gesture performed by the operating body in a preset operating region in the electronic device is acquired.

In step S1103, a second application is determined as a target application based on the identification information of each application in the navigation interface and the information of the first rotating operation gesture.

In step S1104, an interface of the second application is acquired, and is controlled to be displayed the display.

In step S1105, a channel for connecting with each smart home device in a smart home device group is established, and the smart home device group includes at least one smart home device.

Steps S1101 to S1105 are identical with steps S1001 to S1005 in the fourth embodiment, which will not be described in this embodiment.

In step S1106, detection information corresponding to the second application is displayed in the interface of the second application.

The detection information represents a running state of a smart home device corresponding to the second application.

After having established a channel for connecting with the smart home device, the detection information corresponding to the second application is transmitted into the electronic device, and the detection information is displayed in the interface of the second application.

The detection information is numerical information or information related to numerical value.

For example, in the case that the second application is an application related to the temperature, the smart home device corresponding to the second application may be an air-conditioner, and the detection information may be the current temperature of space where the air-conditioner is located, for example, 25 degree Celsius.

The detection information may be information which is detected by a detecting unit of a smart home device and is transmitted to the electronic device via the connecting channel; and may also be information corresponding to the second application which is detected by a detecting unit provided in the electronic device; and may also be information which is detected by a detecting device provided in the region of a smart home device, and transmitted to the electronic device by other means. The method for acquiring the detection information is not limited in this embodiment.

In step S1107, a control signal is generated based on the detection information and is transmitted to the smart home device.

The control signal is configured to instruct the smart home device to adjust a running parameter, and to thereby adjusting a running state of the smart home device.

The detection information represents a detection value corresponding to the second application, and a current running state of a smart home device corresponding to the second application may be determined based on the detection information.

The control signal may be determined based on a standard value preset in the electronic device or based on a target value determined by a user operation.

Generating the control signal based on the detection information includes: information of a first operation performed by the operating body in the preset operating region of the electronic device is received; a target value corresponding to the information of the first operating and the detection information are analyzed to obtain a first difference between the detection information and the target information; and a control signal is generated based on the first difference.

The generating a control signal based on the detection information includes: a present standard value of the second application is acquired; and the preset standard value and the detection information are analyzed to obtain a second difference between the detection information and the preset standard value; and a control signal based on the second difference is generated.

In summary, a control method according to this embodiment further includes: detection information corresponding to the second application is displayed in the interface of the second application, and the detection information represents a running state of a smart home device corresponding to the second application; and a control signal is generated based on the detection information and is transmitted to the smart home device, and the control signal is configured to instruct the smart home device to adjust a running parameter, to thereby adjusting a running state of the smart home device. With the method, the electronic device, as a center control device, displays detection information corresponding to a second application, and generates a control signal to control the adjustment to a running state of the smart home device, to achieve adjusting to an environment condition corresponding to the second application in a physical space where a smart home device is arranged.

In implementation, a control signal may be generated by manual control.

Figure 12:
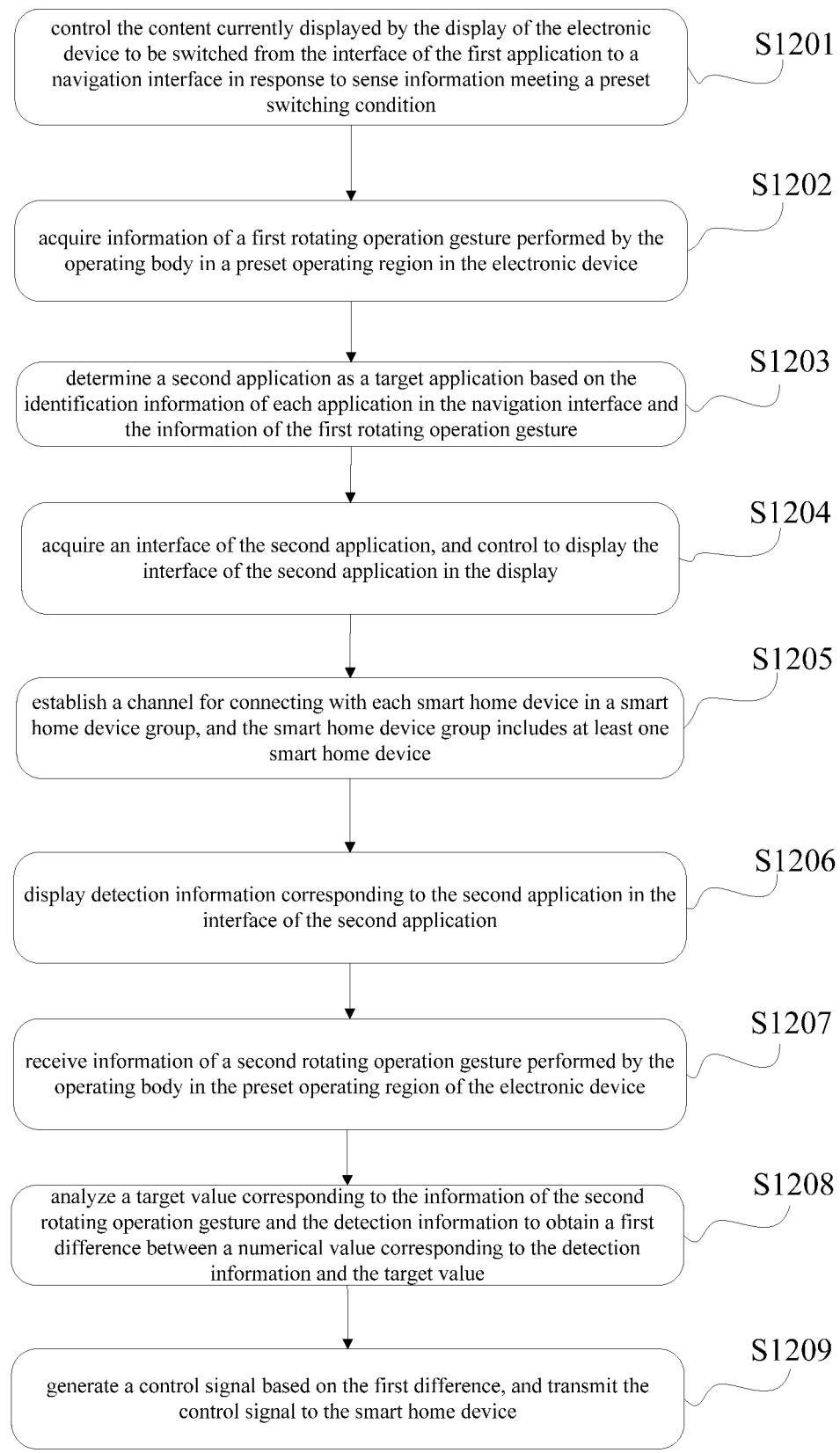
FIG. 12 is a flowchart of a sixth embodiment of a control method according to the disclosure.

As shown in FIG. 12, which is a sixth embodiment of a control method according to the disclosure, the control method may be implemented by the following steps S1201 to S1209.

In step S1201, the content currently displayed by the display of the electronic device is controlled to be switched from the interface of the first application to a navigation interface in response to sense information meeting a preset switching condition.

In step S1202, information of a first rotating operation gesture performed by the operating body in a preset operating region in the electronic device is acquired.

In step S1203, a second application is determined as a target application based on the identification information of each application in the navigation interface and the information of the first rotating operation gesture.

In step S1204, an interface of the second application is acquired, and is controlled to be displayed the display.

In step S1205, a channel for connecting with each smart home device in a smart home device group is established, and the smart home device group includes at least one smart home device.

In step S1206, detection information corresponding to the second application is displayed in the interface of the second application.

Steps S1201 to S1206 are identical with steps S1101 to S1106 in the fifth embodiment, which will not be described in this embodiment.

In step 1207, information of a second rotating operation gesture performed by the operating body in the preset operating region of the electronic device is received.

In the case that the user performs manually adjustment to achieve the adjustment to a running state of the smart home device, the user may continue to perform a second rotating operation gesture similar to the first rotating operation gesture in the preset operating region of the electronic device.

The operating position corresponding to the second rotating operation gesture corresponds to the operating position corresponding to the first rotating operation gesture.

Figure 13:
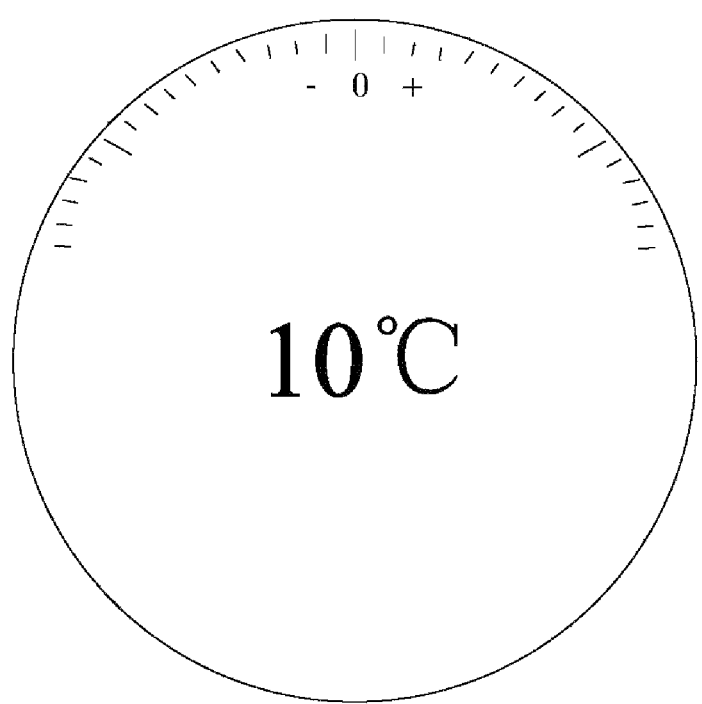
FIG. 13 a schematic view showing an electronic device displaying a second application in the sixth embodiment of the control method according to the disclosure.

As shown in FIG. 13, which is a schematic view showing a second application displayed in the electronic device, the second application is an application for detecting the temperature. The display 1301 of the electronic device has a circular shape, and a surrounding region of the display is an operating region 1302. A numerical value "10", "C", and calibrations arranged on an edge region of the page are included in the interface of the second application. The "10" is a temperature value of a position where an air-conditioner is located, and the "C" is the unit of temperature, and the user may determine that the current temperature of the space where the air-conditioner is located is rather low, and needs to be adjusted, and the calibrations represents calibrations for adjustment. A small lattice represents 1° C., and ten small lattices represent a big lattice. At this time, a thumb and an index finger of the user perform rotating operation gesture clockwise in this region, to raise the temperature by 10° C., then a control signal of raising by 10° C. is generated and transmitted to the air-conditioner, thus accomplishing the adjustment to a running parameter of the air-conditioner, and thereby achieving the adjustment to the running state of the smart home device.

It is to be noted that, in the example according to this embodiment, the calibrations for adjustment are displayed in the interface, and the process of generating control information is achieved by adjusting the calibrations in a positive or negative direction, however, which is not limited thereto. In implementation, it may also display a numerical value corresponding to detection information in the calibrations, the numerical value displayed in the calibrations is adjusted directly, and a control signal is generated based on a result acquired from comparing the data adjusted with the data before being adjusted, and the control signal corresponding to the detection information is transmitted to a respective smart home device to adjust.

It is to be noted that, in this embodiment, the mode corresponding to the adjustment displayed in a way of calibrations is an arrangement corresponding to the rotating gesture operation, however, the display mode is not limited to this. In implementation, other display modes corresponding to the rotating gesture operation may also be adopted.

In step S1208, a target value corresponding to the information of the second rotating operation gesture and the detection information are analyzed to obtain a first difference between a numerical value corresponding to the detection information and the target value.

The second rotating gesture operating information is combined with the information displayed in the interface of the second application, to get a target value, and the target value is an adjustment target value corresponding to the second application.

The target value is compared with data corresponding to the detection information to get a first difference, and the first difference indicates the gap between an environment condition corresponding to a second application and a target state.

For example, in the case that the second application is an application related to the temperature, if a numerical value corresponding to the detection information is 10, and a target value is 22, the difference between the numerical value corresponding to the detection information and the target value is 12, that means a smart home device corresponding to the second application needs to be raised by 12° C.

In step S1209, a control signal is generated based on the first difference and is transmitted to the smart home device.

The control signal is configured to instruct the smart home device to adjust a running parameter, and to adjust a running state of the smart home device.

A control signal corresponding to the first difference is generated based on the first difference, and the control signal is related to the calculating method of the difference.

In the case that the first difference is calculated by a numerical value corresponding to detection information minus the target value, the control signal is to reversely adjust based on a numerical value of a first difference, for example, if the numerical value is positive, a control signal of reducing the first difference is generated. In the case that the first difference is calculated by the target value minus a numerical value corresponding to detection information, the control signal is to positively adjust based on a numerical value of a first difference, for example, if the numerical value is positive, a control signal of increasing the first difference is generated.

In summary, in a control method according to this embodiment, the generating a control signal based on the detection information includes: information of a second rotating operation gesture performed by the operating body in the preset operating region of the electronic device is received; a target value corresponding to the information of the second rotating operation gesture and the detection information are analyzed to obtain a first difference between a numerical value corresponding to the detection information and the target value; and a control signal based on the first difference is generated. With the method of setting the target value by the user, to adjust a running parameter of a smart home device corresponding to the second application, the user participation degree is higher, the user is allowed to set based on his own experience, and a user experience is improved.

In the case that the second detection information represents that the information corresponding to the second application is detected by the detecting unit provided in the electronic device, control information may also be generated automatically.

Figure 14:
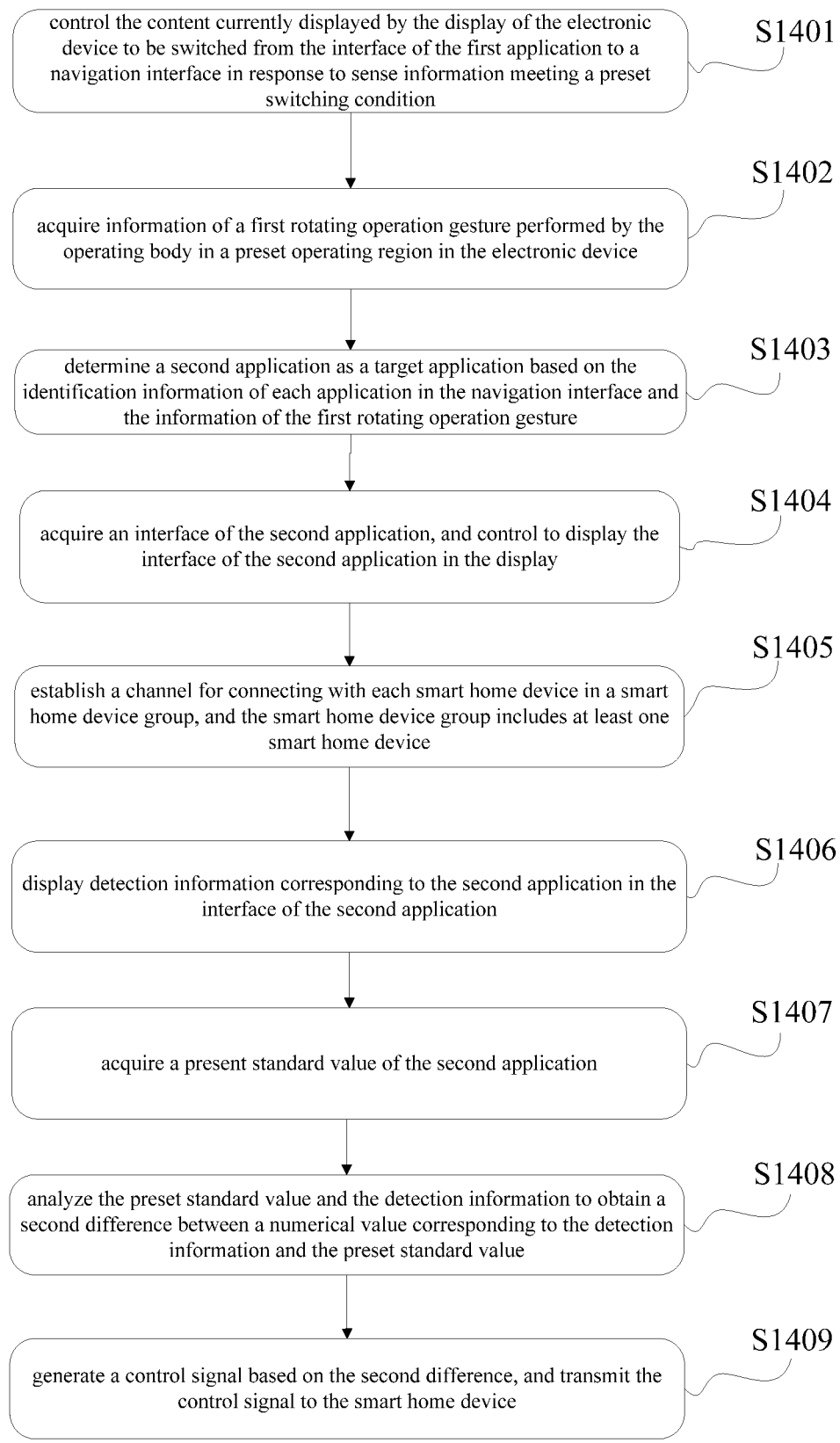
FIG. 14 is a flowchart of a seventh embodiment of a control method according to the disclosure.

As shown in FIG. 14, which is a flowchart of a seventh embodiment of a control method according to the disclosure, the control method may be implemented by the following steps S1401 to S1409.

In step S1401, the content currently displayed by the display of the electronic device is controlled to be switched from the interface of the first application to a navigation interface in response to sense information meeting a preset switching condition.

In step S1402, information of a first rotating operation gesture performed by the operating body in a preset operating region in the electronic device is acquired.

In step S1403, a second application is determined as a target application based on the identification information of each application in the navigation interface and the information of the first rotating operation gesture.

In step S1404, an interface of the second application is acquired, and is controlled to be displayed the display.

In step S1405, a channel for connecting with each smart home device in a smart home device group is established, and the smart home device group includes at least one smart home device.

In step S1406, detection information corresponding to the second application is displayed in the interface of the second application; and the detection information represents a running state of a smart home device corresponding to the second application.

Steps S1401 to S1406 are identical with steps S1101 to S1106 in the fifth embodiment, which will not be described in this embodiment.

In step S1407, a present standard value of the second application is acquired.

Standard values corresponding to various applications which run in the electronic device are preset in the electronic device, and each standard value represents the state of normal running of a smart home device corresponding to the application.

In adjusting a running state of a smart home device corresponding to the second application, it is required to acquire a preset standard corresponding to the second application, for later adjustment to a running state of the smart home device.

In step S1408, the preset standard value and the detection information are analyzed to obtain a second difference between a numerical value corresponding to the detection information and the preset standard value.

The preset standard value is compared with data corresponding to the detection information to get a second difference, and the second difference indicates the gap between an environment condition corresponding to a second application and a preset standard state.

For example, in the case that the second application is an application related to the temperature, if a numerical value corresponding to the detection information is 10, and a preset standard value is 20, the difference between the numerical value corresponding to the detection information and the preset standard value is 10, that means a smart home device corresponding to the second application needs to be raised by 10° C.

In step S1409, a control signal is generated based on the second difference and is transmitted to the smart home device.

The control signal is configured to instruct the smart home device to adjust a running parameter, and to adjust a running state of the smart home device.

A control signal corresponding to the second difference is generated based on the second difference, and the control signal is related to the calculating method of the difference.

In the case that the second difference is calculated by a numerical value corresponding to detection information minus the preset standard value, the control signal is to reversely adjust based on a numerical value of a second difference, for example, if the numerical value is positive, a control signal of reducing the second difference is generated. In the case that the second difference is calculated by the preset standard value minus a numerical value corresponding to detection information, the control signal is to positively adjust based on a numerical value of a second difference, for example, if the numerical value is positive, a control signal of increasing the second difference is generated.

It is to be noted that, generally, a threshold value for adjusting automatically is already preset in a smart home device, thus during running, the smart home device can compare a numerical value detected by itself with a preset threshold, and make adjustment automatically, hence, in this embodiment, the electronic device as a center control device is no longer required to control the smart home device, and this part is not limited in this embodiment, and it only defined that the smart home device is controlled automatically by a result detected locally by the detecting unit provided in the electronic device as a center control device.

In summary, in a control method according to this embodiment, in the case that the second detection information represents that the information corresponding to the second application is detected by a detecting unit provided in the electronic device, the generating a control signal based on the detection information includes: a present standard value of the second application is acquired; and the preset standard value and the detection information are analyzed to obtain a second difference between a numerical value corresponding to the detection information and the preset standard value; and a control signal based on the second difference is generated. With the method of setting a standard value, a running parameter of a smart home device corresponding to a second application is adjusted without participation of the user, and a running parameter of the corresponding smart home device is automatically adjusted timely, thus a user experience is enhanced.

In the case that a control signal is generated by manual control, it is further required to control to start the manually control mode corresponding to the second application.

Figure 15:
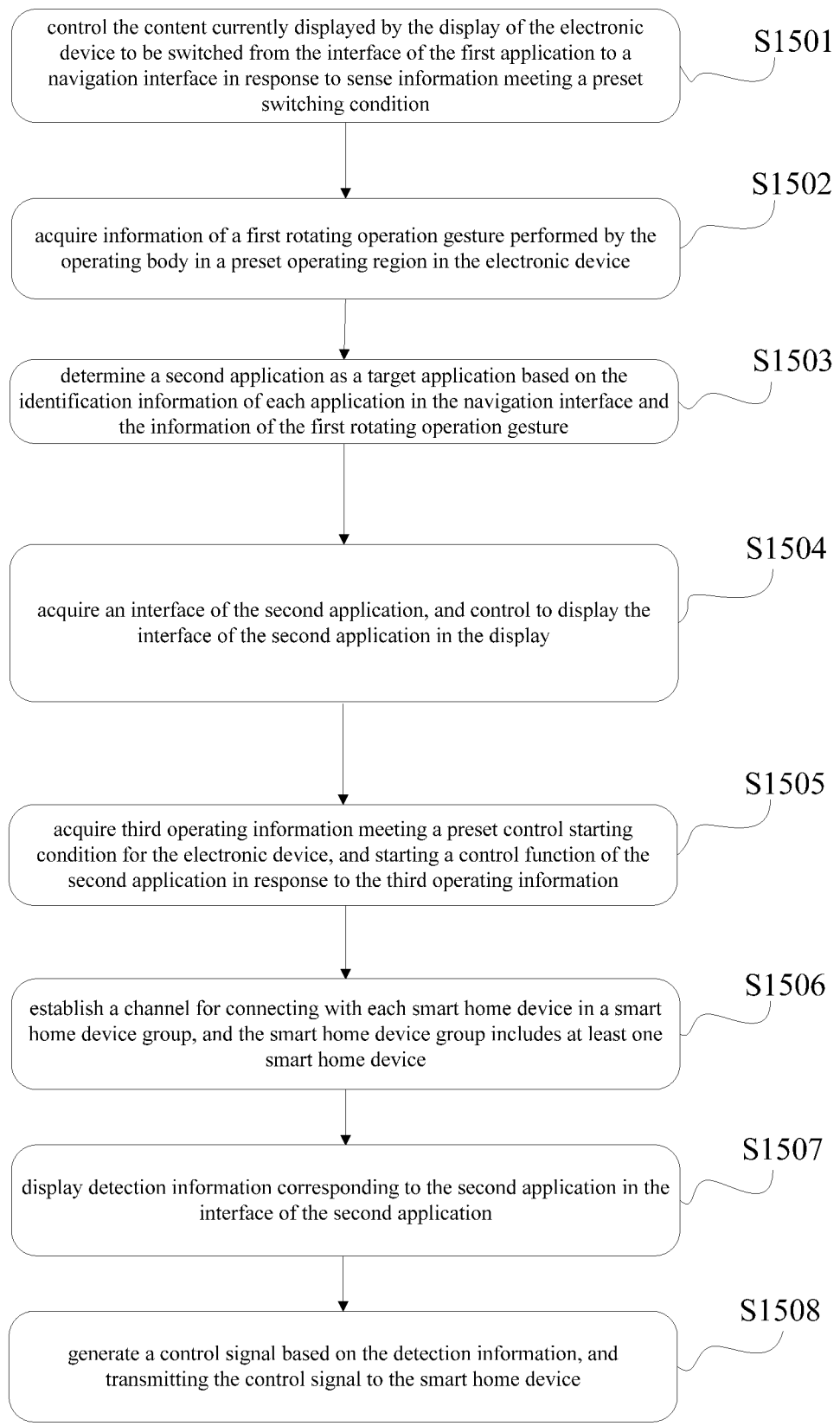
FIG. 15 is a flowchart of an eighth embodiment of the control method according to the disclosure.

As shown in FIG. 15, which is a flowchart of an eighth embodiment of a control method according to the disclosure, the control method may be implemented by the following steps S1501 to S1508.

In step S1501, the content currently displayed by the display of the electronic device is controlled to be switched from the interface of the first application to a navigation interface in response to sense information meeting a preset switching condition.

In step S1502, information of a first rotating operation gesture performed by the operating body in a preset operating region in the electronic device is acquired.

In step S1503, a second application is determined as a target application based on the identification information of each application in the navigation interface and the information of the first rotating operation gesture.

In step S1504, an interface of the second application is acquired, and is controlled to be displayed the display.

Steps S1501 to S1504 are identical with steps S1101 to S1104 in the fifth embodiment, which will not be described in this embodiment.

In step S1505, third operating information meeting a preset control starting condition for the electronic device is acquired, and a control function of the second application is started in response to the third operating information.

In the case that an interface of a second application is displayed on the display, the user may adjust a running state of a smart home device corresponding to the second application manually, and for preventing misoperation, it further requires the user to perform a starting operation, and the starting operation is the third operation which meets a preset control starting condition.

After the third operating information meeting a preset control starting condition is acquired by the electronic device, starting a control function of the second application may be performed in response to the third operating information.

It is to be noted that, the third operation is an operation completely different from one of the operating action of switching to a navigation interface, the first rotating gesture, and the second rotating gesture.

For example, the third operation may be a user clicking with a single finger in an operating region, and the times of the clicking may be one or two, etc.

In step S1506, a channel for connecting with each smart home device in a smart home device group is established, and the smart home device group includes at least one smart home device.

In step S1507, detection information corresponding to the second application is displayed in the interface of the second application; and the detection information represents a running state of a smart home device corresponding to the second application.

In step S1508, a control signal based on the detection information is generated, and the control signal is transmitted to the smart home device.

Steps S1506 to S1508 are identical with steps S1105 to S1107 in the fifth embodiment, which will not be described in this embodiment.

In summary, a control method according to this embodiment, after the second detection information is displayed in the interface of the second application, and before information of a first operation performed by the operating body in the preset operating region of the electronic device is received, further includes that: third operating information meeting a preset control starting condition for the electronic device is acquired, and a control function of the second application is started in response to the third operating information. With this method, a condition for starting a control function of the second application is provided, thus may avoid misoperation of the user, and improve the accuracy of the operation.

Corresponding to a control method according to the present application, an embodiment of an electronic device is further provided according to the disclosure.

Figure 16:
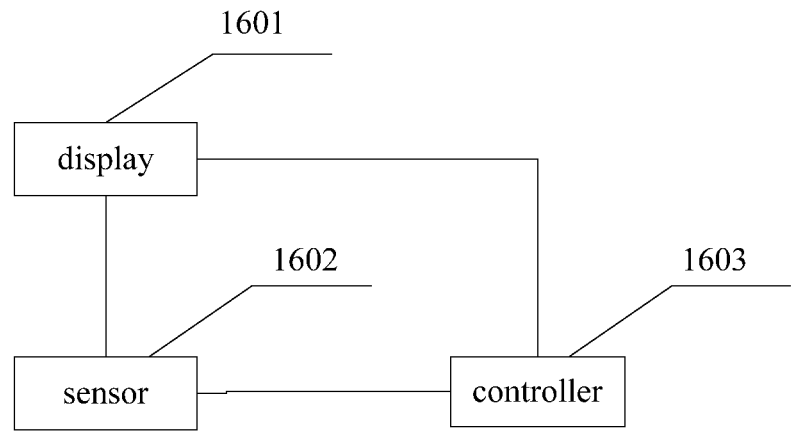
FIG. 16 is a schematic view showing the structure of a first embodiment of an electronic device according to the disclosure.

As shown in FIG. 16, which is a schematic view showing the structure of a first embodiment of an electronic device according to the disclosure, the first embodiment of the electronic device includes a display 1601, a sensor 1602 and a controller 1603.

The electronic device is preset with at least two applications.

The display 1601 is configured to display an interface of each of the applications, and to display currently the interface of a first application.

The sensor 1602 is arranged to surround an outer side of the display, and is configured to acquire sense information generated by the operating body in a preset operating region of the electronic device.

The controller 1603 is connected respectively with the sensor 1602 and the display 1601, and is configured to: control the content currently displayed by the display of the electronic device to be switched from the interface of the first application to a navigation interface when the sense information meets a preset switching condition, with the navigation interface including identification information of each of the at least two applications; and determine a second application as a target application based on information of a rotating operation gesture acquired by the sensor in the preset operating region and the identification information of each application in the navigation interface; and acquire an interface of the second application, and control to display the interface of the second application in the display.

The sensor and the display are arranged not to overlap each other in the direction of displaying.

The controller may be embodied as a process having a processing function, such as a Central Processing Unit (CPU), a Micro Controller Unit (MCU), etc.

In summary, the electronic device according to this embodiment includes: a display, a sensor, and a controller. The display is configured to display an interface of each of the applications, and to display currently the interface of a first application. The sensor is arranged to surround an outer side of the display, and is configured to acquire sense information generated by the operating body in a preset operating region of the electronic device. The controller is connected respectively with the sensor and the display, and is configured to: control the content currently displayed by the display of the electronic device to be switched from the interface of the first application to a navigation interface when the sense information meets a preset switching condition, the navigation interface includes identification information of each of the at least two applications; determine a second application as a target application based on information of a rotating operation gesture acquired by the sensor in the preset operating region and the identification information of each application in the navigation interface; and acquire an interface of the second application, and control to display the interface of the second application in the display. The sensor and the display are arranged not to overlap each other in the direction of displaying. In the case of switching an interface of a first application to an interface of a second application, first, if sense information received meets a preset switching condition, the interface of the first application is switched to a navigation interface. Identification information of each application in the electronic device is included in the navigation interface, and the user may determine rapidly the relative position between the identification information of the first application and the identification information of the second application as a target application based on the arrangement of the various identification information in the navigation interface displayed in the display. Then the user performs a rotating operation in the preset operating region, and when the rotating operation finishes, based on the relative relationship between the position where the rotating operation finishes and the position where the rotating operation starts, the electronic device positions the target application rapidly, and displays the display interface of the target application in the display.

Figure 17:
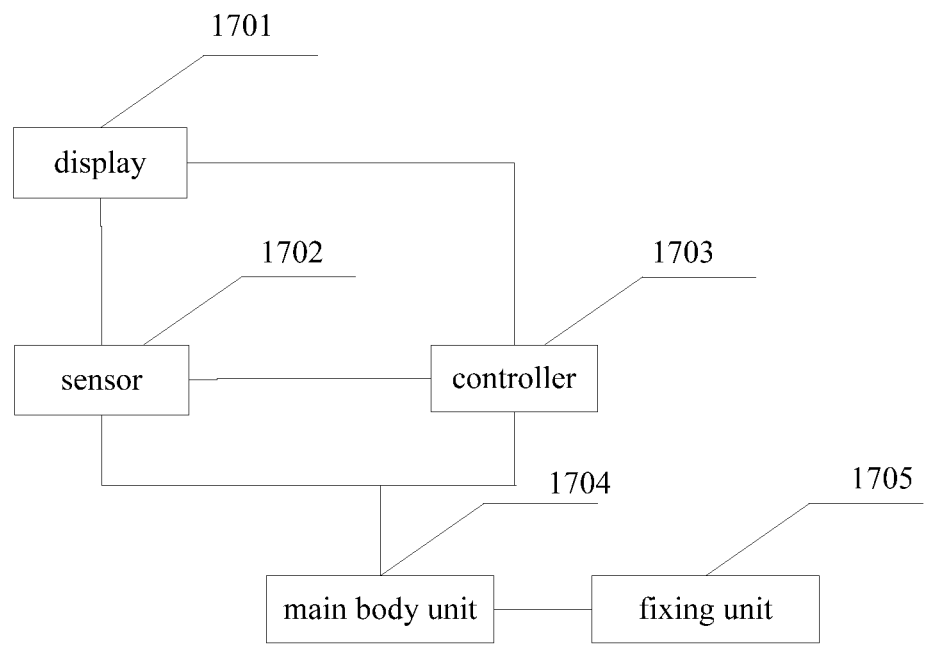
FIG. 17 is a schematic view showing the structure of a second embodiment of an electronic device according to the disclosure.

As shown in FIG. 17, which is a schematic view showing the structure of a second embodiment of an electronic device according to the disclosure, the second embodiment of the electronic device includes a display 1701, a sensor 1702, a controller 1703, a main body unit 1704 and a fixing unit 1705.

Functions of a display 1701, a sensor 1702 and a controller 1703 and connecting relationship therebetween are the same as the corresponding structures in the first embodiment, which will not be described in this embodiment.

The sensor 1702 is arranged in the main body unit 1704, and the main body unit 1704 bears the controller 1703, the main body unit 1704 and the fixing unit 1705 are fixedly connected, and the fixing unit has at least a fixing state.

The display 1701 is arranged at a first side of the main body unit 1704, and the display 1701 has a caliber less than a preset threshold.

The fixing unit 1705 serves as at least one portion of a ring-shaped space, or as at least one portion of an approximate ring-shaped space which meets a first preset condition; and the ring-shaped space or the approximate ring-shaped space surrounds an outer peripheral of a columnar body which meets a second preset condition.

The first side means an outer side of the ring-shaped space or the approximate ring-shaped space in the main body unit.

The fixing unit and the main body unit may have two connecting relationships, i.e., the fixing unit is connected to two ends of the main body unit, or the main body unit is connected to two ends of the fixing unit, to allow the fixing unit and the main body unit to be respectively parts forming the ring-shaped space or the approximate ring-shaped space; or the fixing unit constitutes the ring-shaped space or the approximate ring-shaped space independently, and the main body unit is connected to an outer surface of the fixing unit.

The columnar body may be a cylinder, and may also be an irregular elliptical cylinder.

The approximate ring-shaped space is a ring-shaped space which has an opening, and the first preset condition represents that the opening is smaller than the caliber of the columnar body. The caliber means the diameter of the columnar body, real axial length, and an approximate axial length, the imaginary axial length or an approximate imaginary axial length, etc.

The second preset condition represents that the columnar body is required to be smaller than the caliber of the ring-shaped space.

In implementation, the columnar body may be specifically a wrist, and the electronic device is a device of a wristband type.

Two ends of the columnar body are larger than the caliber of the ring-shaped space, and a middle portion of which is smaller than the caliber of the ring-shaped space, to achieve relatively fixing between the columnar body and the electronic device.

In the case that the columnar is a wrist, then only one end of the columnar body is required to be larger than the caliber of the ring-shaped space.

It is to be noted that, the fixing unit having at least a fixing state includes: the fixing unit has only a fixing state, or the fixing unit has two states, i.e., a fixing state and a non-fixing state.

In the case that the device as a wrist band type is in a type of watch buckle which can be released, a watchband, as a fixing unit, has a fixing state (the watch buckle is buckled), and a non-fixing state (the watch buckle is released), and in the case that the device is in a bracelet type, the bracelet watchband as a fixing unit has only a fixing state.

Figure 18:
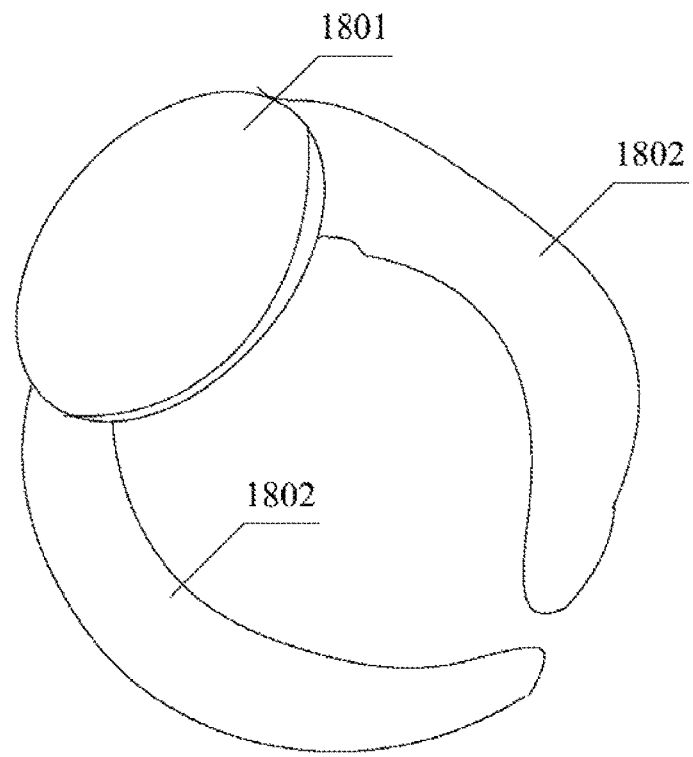
FIG. 18 is a schematic view showing an external structure of an electronic device in the second embodiment of the electronic device according to the disclosure.

As shown in FIG. 18, which is a schematic view showing an external structure of an electronic device, a main body unit 1801 is an independent structure, and a fixing unit 1802 is composed of two parts. The fixing unit 1802 is connected to two ends of the main body unit 1801, and the fixing unit and the main body unit form an approximate ring-shaped space.

Figure 19:
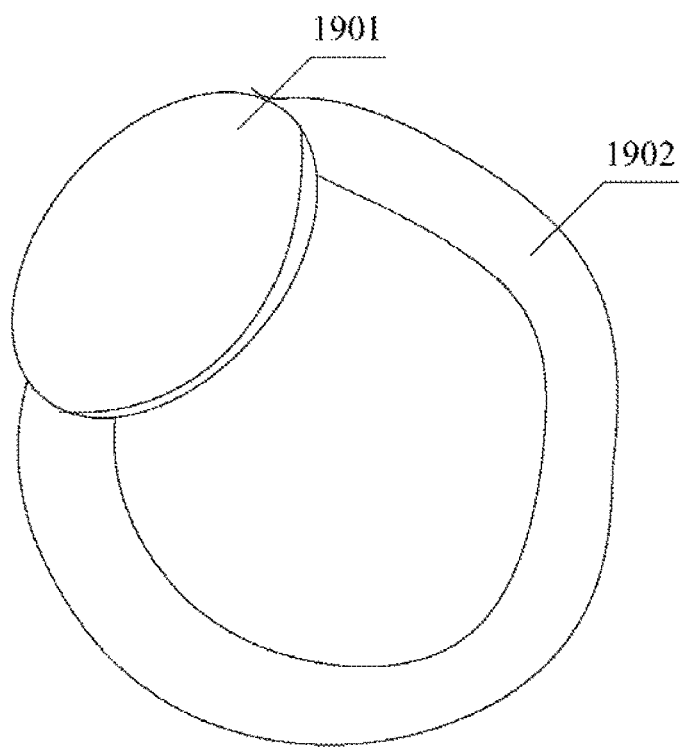
FIG. 19 is a schematic view showing another external structure of an electronic device in the second embodiment of the electronic device according to the disclosure.

As shown in FIG. 19, which is a schematic view showing another external structure of an electronic device, a main body unit 1901 is an independent structure, and a fixing unit 1902 is also an independent structure, the fixing unit 1902 is connected to two ends of the main body unit 1901, and the fixing unit and the main body unit form a ring-shaped space.

Figure 20:
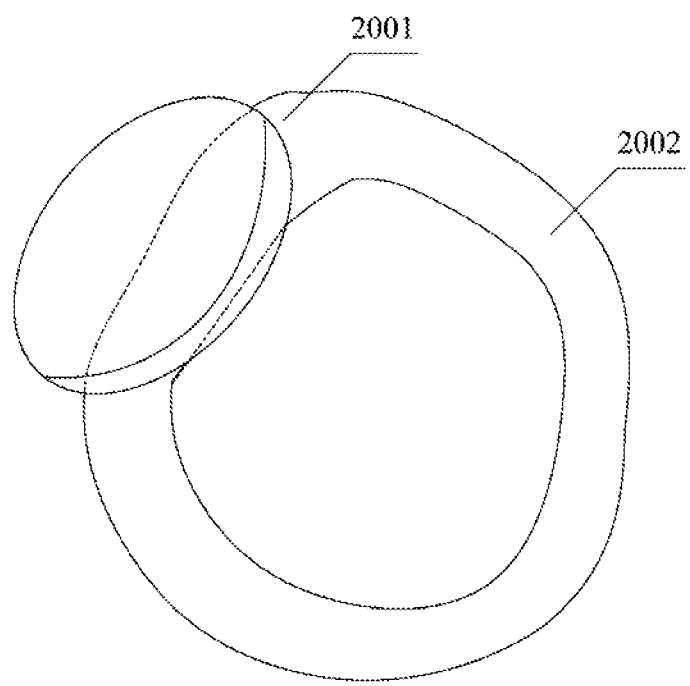
FIG. 20 is a schematic view showing still another external structure of an electronic device in the second embodiment of the electronic device according to the disclosure.

As shown in FIG. 20, which is a schematic view showing still another external structure of an electronic device, a main body unit 2001 is an independent structure, and a fixing unit 2002 is also an independent structure, the fixing unit 2002 is fixedly connected to the main body unit 2001 via an external surface.

The above embodiments are described in a progressive manner. Each of the embodiments is mainly focused on describing its differences from other embodiments, and references may be made among these embodiments with respect to the same or similar portions among these embodiments. For the device provided by the embodiments, the description of the electronic device is simple since it corresponds to the method provided by the embodiments; and for the related parts, references may be made to the illustration of the method embodiments with respect to the related parts.

Based on the above description of the provided embodiments, the person skilled in the art is capable of carrying out or using the disclosure. It is obvious for the person skilled in the art to make many modifications to these embodiments. The general principle defined herein may be applied to other embodiments without departing from the spirit or scope of the disclosure. Therefore, the disclosure is not limited to the embodiments illustrated herein, but should be defined by the broadest scope consistent with the principle and novel features provided herein.

The invention claimed is:

1. A control method for controlling an electronic device, wherein the control method comprises:
  receiving sense information generated by an operating body;
  determining whether the sense information meets a preset switching condition;
  controlling a first application currently displayed in a display interface of the electronic device to exit from the display interface of the electronic device so as to display a navigation interface in the display interface of the electronic device in response to the sense information meeting the preset switching condition, wherein the navigation interface comprises identification information of each of at least two applications, wherein the sense information generated by the operating body comprises information that the operating body performs a pressing operation on an outer edge of the electronic device;
  acquiring information of a first rotating operation gesture performed by the operating body in a preset operating region in the electronic device, wherein the first rotating operation gesture is used for locating a target application to be switched to, and the first rotating operation gesture indicates that the operating body performs a rotating operation on the outer edge of the electronic device to select the target application, wherein after the operating body performs the pressing operation on the outer edge of the electronic device, the operating body keeps in contact with the outer edge of the electronic device to perform the rotating operation, wherein the applications displayed in the navigation interface move in a rotating manner along with the rotating operation;
  determining a second application as the target application based on the identification information of each application in the navigation interface and the information of the first rotating operation gesture; and
  acquiring an interface of the second application, and controlling to display the interface of the second application in the display.

2. The control method according to claim 1, wherein the receiving sense information generated by an operating body comprises:
  receiving second sense information acquired by a second sensor, wherein the second sensor is a contact sensor, and wherein the determining whether the sense information meets a preset switching condition comprises:
  analyzing the second sense information to obtain an operating action performed by the operating body in a preset region of the electronic device; and
  comparing the operating action with a preset standard switching action, to generate a comparison result,
  wherein if the comparison result indicates that a matching degree between the operating action and the preset standard switching action is greater than a preset threshold, the sense information meets the preset switching condition.

3. The control method according to claim 2, wherein in the case that the second sense information is contact sense information, the controlling content currently displayed by a display of the electronic device to be switched from an interface of a first application to a navigation interface in response to sense information meeting a preset switching condition and the acquiring information of a first rotating operation gesture performed by the operating body in a preset operating region in the electronic device comprise:
  grouping first operating information acquired in real time into a first information group and a second information group based on a preset grouping rule, wherein the first operating information represents that the operating body performs an operation in the preset operating region of the electronic device, and the first operating information comprises information of at least two operating parameters;
  identifying the first information group to obtain a first command, and controlling the content currently displayed by the display of the electronic device to be switched from the interface of the first application to the navigation interface based on the first command; and
  identifying the second information group to obtain a second command, wherein the second information group comprises information of a rotating operation gesture corresponding to a shape of the preset operating region in the electronic device,
  wherein the first information group is continuous with the second information group in time.

4. The control method according to claim 1, further comprising:
  establishing a channel for connecting with each smart home device in a smart home device group, wherein the smart home device group comprises at least one smart home device,
  wherein the smart home device group is arranged in a physical space, and variation of a working state of each smart home device can change an environment condition of the physical space, and each smart home device has a first control mode and a second control mode, the first control mode is to respond to a received user operation, and the second control mode is to respond to a received control command sent by the electronic device.

5. The control method according to claim 4, further comprising:

displaying detection information corresponding to the second application in the interface of the second application, wherein the detection information represents a running state of a smart home device corresponding to the second application; and generating a control signal based on the detection information, and transmitting the control signal to the smart home device, wherein the control signal is configured to instruct the smart home device to adjust a running parameter, and to thereby adjusting the running state of the smart home device.

6. The control method according to claim 5, wherein the displaying detection information corresponding to the second application in the interface of the second application comprises:

receiving in real time first detection information detected by a detecting unit of the smart home device; and displaying the first detection information in the interface of the second application;

or acquiring in real time second detection information corresponding to the second application, wherein the second detection information represents that information corresponding to the second application is detected by a detecting unit provided in the electronic device; and displaying the second detection information in the interface of the second application.

7. The control method according to claim 6, wherein the generating a control signal based on the detection information comprises:

receiving information of a second rotating operation gesture performed by the operating body in the preset operating region of the electronic device;

analyzing a target value corresponding to the information of the second rotating operation gesture and the detection information to obtain a first difference between a numerical value corresponding to the detection information and the target value; and generating the control signal based on the first difference.

8. The control method according to claim 6, wherein in the case that the second detection information represents that the information corresponding to the second application is detected by the detecting unit provided in the electronic device, the generating a control signal based on the detection information comprises:

acquiring a preset standard value of the second application;

analyzing the preset standard value and the detection information to obtain a second difference between a numerical value corresponding to the detection information and the preset standard value; and generating the control signal based on the second difference.

9. The control method according to claim 6, wherein after the second detection information is displayed in the interface of the second application, and before information of a first operation performed by the operating body in the preset operating region of the electronic device is received, the control method further comprises:

acquiring third operating information meeting a preset control starting condition for the electronic device, and starting a control function of the second application in response to the third operating information.

10. An electronic device, comprising:

a display interface configured to display an interface of each of applications, and to display currently the interface of a first application;

a sensor arranged to surround an outer side of the display interface, and configured to acquire sense information generated by an operating body in a preset operating region of the electronic device; and a controller connected respectively with the sensor and the display interface, and configured to: determine whether the sense information meets a preset switching condition; control a first application currently displayed in the display interface of the display of the electronic device to exit from the display interface of the electronic device so as to display a navigation interface in the display interface of the electronic device when the sense information meets the preset switching condition, wherein the navigation interface comprises identification information of each of at least two applications, wherein the sense information generated by the operating body comprises information that the operating body performs a pressing operation on an outer edge of the electronic device;

acquire information of a first rotating operation gesture performed by the operating body in the preset operating region in the electronic device, wherein the rotating operation gesture is use for locating a target application to be switched to, and the first rotating operation gesture indicates that the operating body performs a rotating operation on the outer edge of the electronic device to select the target application, wherein after the operating body performs the pressing operating on the outer edge of the electronic device, the operating body keeps in contact with the outer edge of the electronic device to perform the rotating operation, wherein the applications displayed in the navigation interface move in a rotating manner along with the rotating operation;

determine a second application as the target application based on information of the rotating operation gesture acquired by the sensor in the preset operating region and the identification information of each application in the navigation interface; and acquire an interface of the second application, and control to display the interface of the second application in the display interface.

11. The electronic device according to claim 10, wherein the sensor is a non-contact sensor, and the controller is configured to determine whether the sense information meets the preset switching condition by:

analyzing first sense information acquired by the non-contact sensor to obtain a distance between the operating body and the electronic device; and comparing the distance with a preset value to obtain a comparison result, wherein if the comparison result indicates that the distance is less than the preset value, the controller determines that the sense information meets the preset switching condition.

12. The electronic device according to claim 10, further comprising a main body unit and a fixing unit; wherein, the sensor is arranged in the main body unit, and the main body unit bears the controller, the main body unit and the fixing unit are fixedly connected, and the fixing unit has at least a fixing state;

the display interface is arranged at a first side of the main body unit, and the display interface has a caliber less than a preset threshold;

the fixing unit serves as at least one portion of a ring-shaped space, or as at least one portion of an approximate ring-shaped space meeting a first preset condition; and the ring-shaped space or the approximate ring-shaped space surrounds an outer peripheral of a columnar body which meets a second preset condition; and the first side means an outer side of the ring-shaped space or the approximate ring-shaped space in the main body unit.

13. A wearable device comprising an electronic device, wherein the electronic device comprises:

a display interface configured to display an interface of each of applications, and to display currently the interface of a first application;

a sensor arranged to surround an outer side of the display interface, and configured to acquire sense information generated by an operating body in a preset operating region of the electronic device; and a controller connected respectively with the sensor and the display interface, and configured to:

determine whether the sense information meets a preset switching condition; control a first application currently displayed in the display interface of the electronic device to exit from the display interface of the electronic device so as to display a navigation interface in the display interface of the electronic device when the sense information meets the preset switching condition, wherein the navigation interface comprises identification information of each of the at least two applications, wherein the sense information generated by the operating body comprises information that the operating body performs a pressing operation on an outer edge the electronic device;

acquire information of a first rotating operation gesture performed by the operating body in the preset operating region in the electronic device, wherein the first rotating operation gesture is used for locating a target application to be switched to, and the first rotating operation gesture indicates that the operating body performs a rotating operation on the outer edge of the electronic device to select the target application, wherein after the operating body performs the pressing operation on the outer edge of the electronic device, the operating body keeps in contact with the outer edge of the electronic device to perform the rotating operation, wherein the applications displayed in the navigation interface move in a rotating manner along with the rotating operation;

determine a second application as the target application based on information of the rotating operation gesture acquired by the sensor in the preset operating region and the identification information of each application in the navigation interface; and acquire an interface of the second application, and control to display the interface of the second application in the display interface.

14. The wearable device according to claim 13, wherein the sensor is a non-contact sensor, and the controller is configured to determine whether the sense information meets the preset switching condition by:

analyzing first sense information acquired by the non-contact sensor to obtain a distance between the operating body and the electronic device; and comparing the distance with a preset value to obtain a comparison result, wherein if the comparison result indicates that the distance is less than the preset value, the controller determines that the sense information meets the preset switching condition.

* * * * *